(12) United States Patent
Sumiyoshi et al.

(10) Patent No.: US 8,281,340 B2
(45) Date of Patent: Oct. 2, 2012

(54) INFORMATION PROCESSING APPARATUS AND METHOD, AND PROGRAM

(75) Inventors: Kazuhito Sumiyoshi, Tokyo (JP); Koji Matsuura, Tokyo (JP); Hideki Asazu, Tokyo (JP)

(73) Assignee: Sony Corporation (JP)

( * ) Notice: Subject to any disclaimer, the term of this patent is extended or adjusted under 35 U.S.C. 154(b) by 648 days.

(21) Appl. No.: 12/011,988

(22) Filed: Jan. 30, 2008

(65) Prior Publication Data

US 2008/0244656 A1     Oct. 2, 2008

(30) Foreign Application Priority Data

Jan. 31, 2007    (JP) ................................ P2007-020529

(51) Int. Cl.
H04N 5/445       (2011.01)
(52) U.S. Cl. .............................. 725/46; 725/47; 709/219
(58) Field of Classification Search .............. 725/37–61, 725/86–120; 709/217–232
See application file for complete search history.

(56) References Cited

U.S. PATENT DOCUMENTS

| | | | | |
|---|---|---|---|---|
| 6,163,316 A | * | 12/2000 | Killian | 715/721 |
| 6,177,931 B1 | * | 1/2001 | Alexander et al. | 725/52 |
| 6,704,931 B1 | * | 3/2004 | Schaffer et al. | 725/46 |
| 7,370,343 B1 | * | 5/2008 | Ellis | 725/58 |
| 7,594,245 B2 | * | 9/2009 | Sezan et al. | 725/46 |
| 2006/0221235 A1 | | 10/2006 | Kusumoto | |

FOREIGN PATENT DOCUMENTS

| | | |
|---|---|---|
| JP | 2004-194095 A | 7/2004 |
| JP | 2004-194108 A | 7/2004 |
| JP | 2005-192062 A | 7/2005 |
| WO | 00/33571 A1 | 6/2000 |
| WO | 2005/064928 A1 | 7/2005 |

* cited by examiner

*Primary Examiner* — Annan Shang
(74) *Attorney, Agent, or Firm* — Lerner, David, Littenberg, Krumholz & Mentlik, LLP

(57) ABSTRACT

In the present invention, there is provided an information processing apparatus for recommending contents. The information processing apparatus may include recommendation information generating means for generating recommendation information for presenting a recommended content to be recommended to a user to the user, and when presenting the recommendation information to the user, changing a form of presentation of at least a part of the recommendation information.

19 Claims, 15 Drawing Sheets

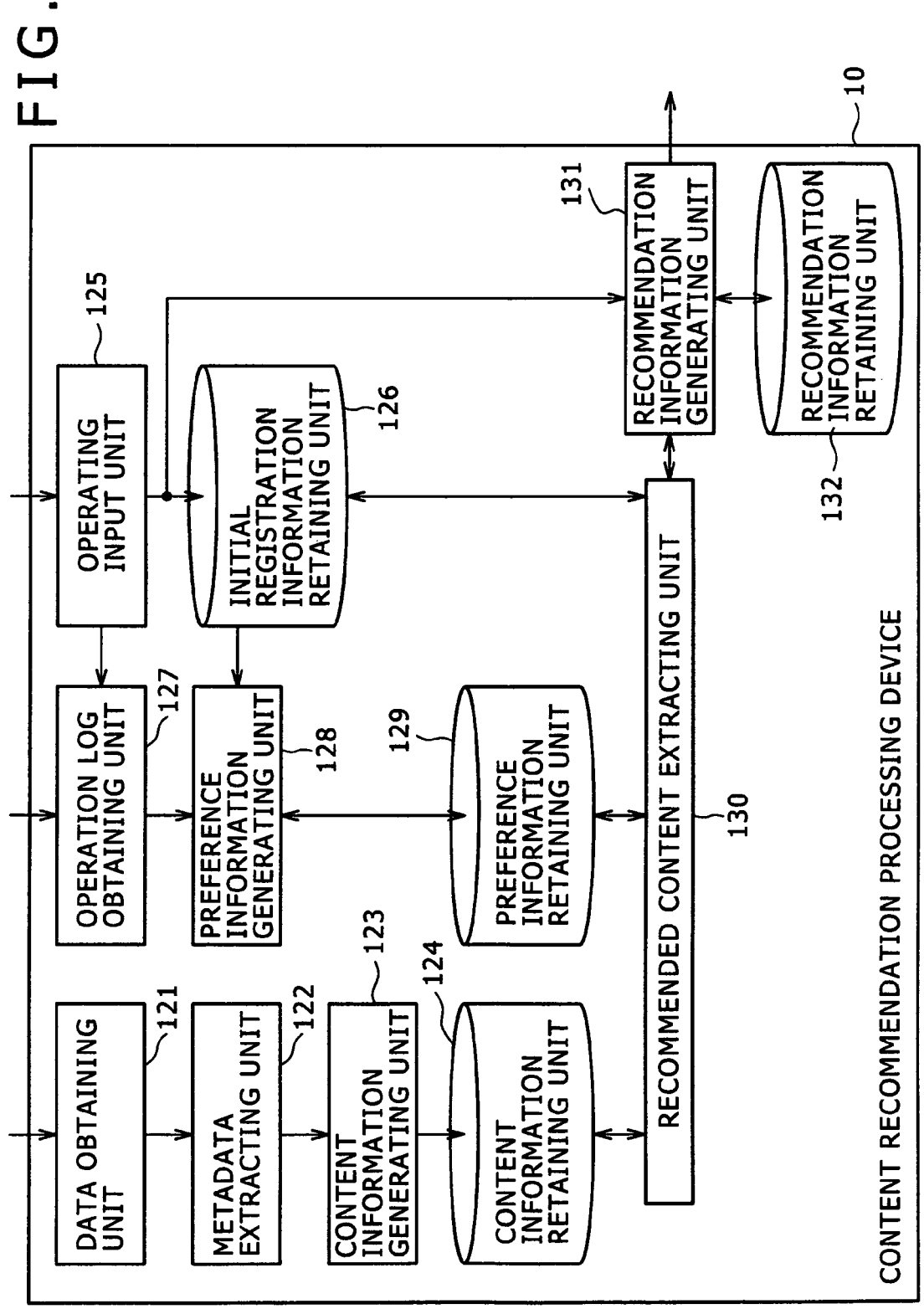

FIG. 12

| CONTENT INFORMATION | PP=(Tm,Gm,Hm,Sm,Pm,Am,Km) |
|---|---|
| T:TITLE (TITLE) | Tm= {TITLE} |
| G:GENRE (GENRE) | Gm= {DRAMA, VARIETY, SPORTS, MOVIE, MUSIC, CHILD-ORIENTED/EDUCATION, CULTURE/DOCUMENT, NEWS/REPORT, OTHERS} |
| H:TIME PERIOD (HOUR) | Hm= {MORNING, NOON, EVENING, PRIME TIME, MIDNIGHT} |
| S:BROADCASTING STATION (TV STATION) | Sm= {NNK SOGO, NNK KYOUIKU, ASIA TELEVISION, TTS, BUJI, TELENICHI, TOTO, NNK EISEI DAIICHI, NNK EISEI DAINI, WOWO} |
| P:PERFORMER (PERSON) | Pm= {PERSON A, PERSON B,···,} |
| A:SCRIPT/ORIGINAL/DIRECTION (AUTHOR) | Am= {PERSON a, PERSON b,···,} |
| K:CONTENTS (KEYWORD) (KEYWORD) | Km= {KW1, KW2,···,} |

FIG.13

| USER PREFERENCE INFORMATION | UP=(Tup, Gup, Pup, Aup, Kup) |
|---|---|
| TITLE | Tup= {(TITLE 1—12), (TITLE 2—3),,} |
| GENRE | Gup= {(DORAMA—25), (VARIETY—34), (SPORTS—42), (MOVIE—37), (MUSIC—73), (CHILD-ORIENTED/EDUCATION—120), (CULTURE/DOCUMENT—3), (NEWS/REPORT—5), (OTHER—23)} |
| PERFORMER | Pup= {(PERSON A—10), (PERSON B—43),···,} |
| SCRIPT/ORIGINAL/DIRECTION | Aup= {(PERSON a—8), (PERSON b—2),···,} |
| CONTENTS (KEYWORD) | Kup= {(KW1—32), (KW2—73),···,} |

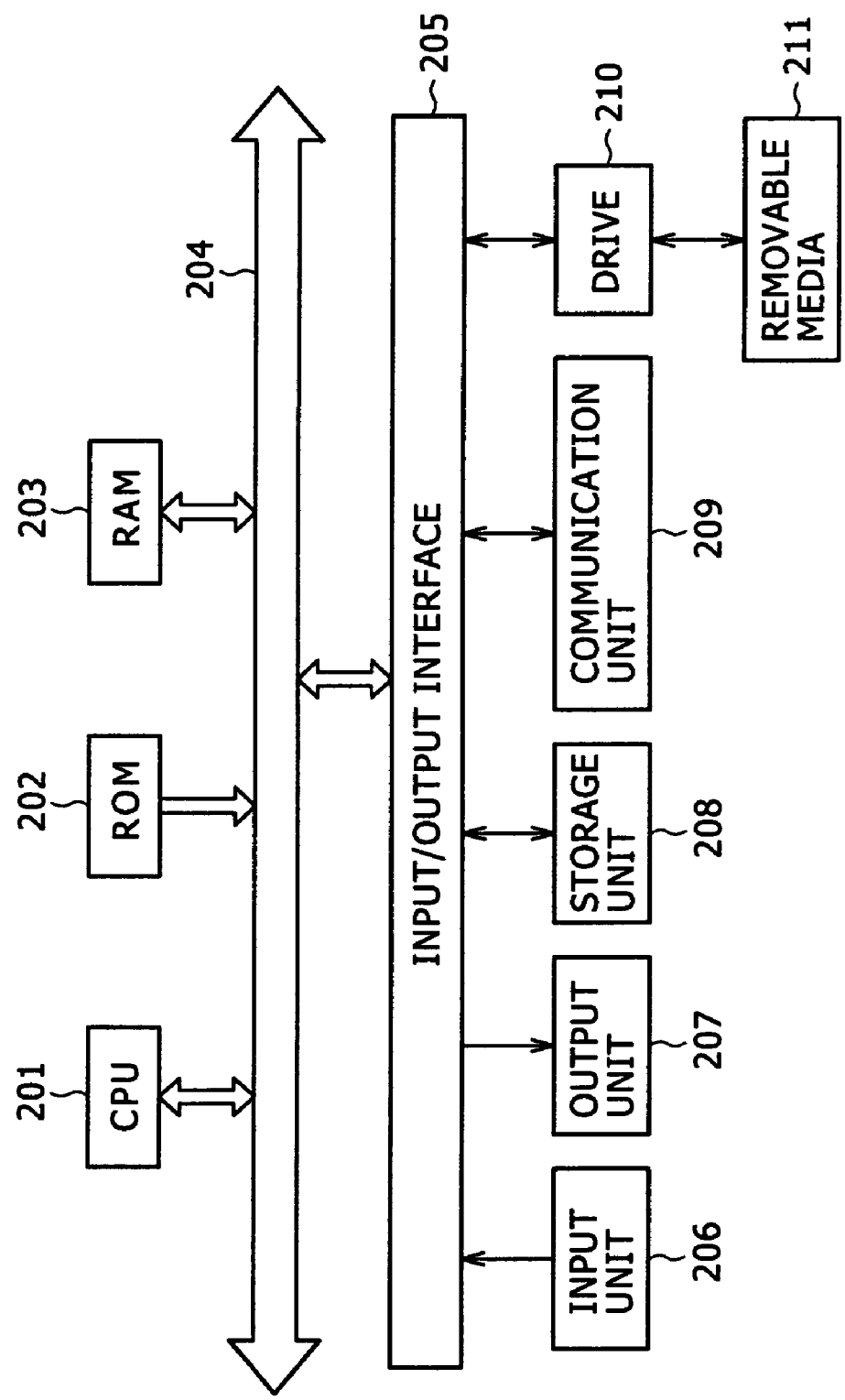

INFORMATION PROCESSING APPARATUS AND METHOD, AND PROGRAM

CROSS-REFERENCE TO RELATED APPLICATIONS

This application claims priority from Japanese Patent Application No. JP 2007-020529 filed in the Japanese Patent Office on Jan. 31, 2007, the entire content of which is incorporated herein by reference.

BACKGROUND OF THE INVENTION

1. Field of the Invention

The present invention relates to an apparatus and a method for information processing, and a program, and particularly to an apparatus and a method for information processing, and a program that can effectively present a recommended content during an effective period without obstructing the viewing of a user.

2. Description of the Related Art Japanese Patent Laid-Open No. 2005-192062 (hereinafter referred to as Patent Document 1) discloses techniques that provide a video receiving apparatus and a program recommendation method that automatically display two screens when a recommended program is started while a program is being viewed and which enable a program selected from the programs displayed on the two screens to be viewed on one screen.

SUMMARY OF THE INVENTION

However, the techniques of Patent Document 1 have a problem of presenting only a program after a start of broadcasting of the program as a recommended program. That is, a recommended program cannot be notified before broadcasting of the recommended program. As a result, when the recommended program is notified after a start of the broadcasting of the recommended program and the recommended program is a program desired to be recorded, it is too late to perform the recording of the recommended program.

In addition, there is a problem in that the two-screen display realized by the techniques of Patent Document 1 is not effective in many cases. Specifically, when commercial video is being displayed even after a start of broadcasting of a recommended program, the contents themselves of the recommended program cannot be checked though the recommended program is displayed on a screen, or two or more recommended programs (for example respective programs broadcast from different broadcasting stations in a same time period) cannot be displayed in the first place.

The above problems when summarized come down to a problem that when contents include not only broadcast programs but also distribution contents and the like and a recommended content is to be presented to a user, the techniques in Patent Document 1 and the like cannot fully achieve effective presentation of the recommended content during an effective period without obstructing the viewing of the user.

The present invention has been made in view of such a situation. It may be desirable to effectively present a recommended content during an effective period without obstructing the viewing of a user.

According to an embodiment of the present invention, there is provided an information processing apparatus for recommending contents, the information processing apparatus may include recommendation information generating means for generating recommendation information for presenting a recommended content to be recommended to a user, and when presenting the recommendation information to the user, changing a form of presentation of at least a part of the recommendation information.

The recommendation information generating means may change the form of presentation of the recommendation information by displaying at least a part of the recommendation information as an animation.

The recommendation information generating means may change the form of presentation of the recommendation information by temporally changing size of display of at least a part of the recommendation information.

The recommendation information generating means may change the form of presentation of the recommendation information by temporally changing a spatial position of display of at least a part of the recommendation information.

The recommendation information generating means may change the form of presentation of the recommendation information by making blinking display of at least a part of the recommendation information.

The recommendation information generating means may change the form of presentation of the recommendation information by changing a form of output of sound according to the recommendation information.

The information processing apparatus may further include recommended content extracting means for setting one or more contents that are being distributed or whose distribution is to be started from one or more distribution sources, respectively, as processing objects, and extracting one or more recommended contents from the processing objects, wherein the recommendation information generating means changes the form of presentation of at least a part of the recommendation information according to a description of a predetermined element of one or more elements related to a process of extracting the recommended content by the recommended content extracting means.

A recommendation reason which is a reason that the recommended content extracting means has extracted the recommended content may be used as the predetermined element, and the recommendation information generating means may include the recommendation reason of the recommended content in the recommendation information, whereby the form of presentation of the recommendation information may be changed for each content extracted as a recommended content by the recommended content extracting means.

The recommendation information generating means may generate first recommendation information on the recommended content and present the first recommendation information to the user, and when the user gives a predetermined instruction, the recommendation information generating means may generate second recommendation information having a larger amount of information than the first recommendation information on the recommended content and present the second recommendation information to the user, whereby the form of presentation of the recommendation information may be changed.

There are a plurality of recommended contents, and the recommendation information generating means may include information indicating a number of the plurality of recommended contents in the first recommendation information and include information for enabling the user to identify each of the plurality of recommended contents in the second recommendation information.

The second recommendation information may at least include a first area for displaying content information on a predetermined one of the plurality of recommended contents and a second area for displaying information offered for an operation of changing the content information displayed in the first area.

The second recommendation information may at least include an area for displaying a list of each piece of content information on each of the plurality of recommended contents.

A form of presentation of the second recommendation information may include a first presentation form displaying a first image which may at least include a first area for displaying content information on a predetermined one of the plurality of recommended contents and a second area for displaying information offered for an operation of changing the content information displayed in the first area and a second presentation form displaying a second image which may at least include a third area for displaying a list of each piece of content information on each of the plurality of recommended contents, and the recommendation information generating means may present the second recommendation information while switching between the first presentation form and the second presentation form.

An information processing method and a program according to an embodiment of the present invention may be a method and a program corresponding to the information processing apparatus according to the above-described embodiment of the present invention.

In the information processing apparatus, the information processing method, and the program according to the above-described embodiments of the present invention, recommendation information for presenting a recommended content to be recommended to a user to the user may be generated, and when presenting the recommendation information to the user, a form of presentation of at least a part of the recommendation information may be changed.

As described above, according to the present invention, recommended contents can be provided to the user. In particular, it may be possible to effectively present a recommended content during an effective period without obstructing the viewing of a user.

BRIEF DESCRIPTION OF THE DRAWINGS

FIG. 11 is a functional block diagram showing an example of functional configuration of the content recommendation processing device in FIG. 1 as an information processing apparatus to which an embodiment according to the present invention is applied;

FIG. 12 is a diagram showing an example of content information retained by a content information retaining unit in FIG. 11;

FIG. 13 is a diagram showing an example of preference information retained by a preference information retaining unit in FIG. 11;

FIG. 15 is a block diagram showing an example of configuration of a personal computer as an information processing apparatus to which an embodiment according to the present invention is applied.

DETAILED DESCRIPTION

Preferred embodiments of the present invention will hereinafter be described. Correspondences between constitutional requirements of the present invention and embodiments described in the detailed description of the invention are illustrated as follows. This description is to confirm that embodiments supporting the present invention are described in the detailed description of the invention. Therefore, even when there is an embodiment described in the detailed description of the invention but not described here as corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Further, this description does not signify that inventions corresponding to concrete examples described in embodiments of the invention are all described in the claims. In other words, this description does not negate presence of inventions corresponding to concrete examples described in embodiments of the invention but not described in the claims of the present application, that is, presence of inventions to be presented in a divisional application or to be added by amendments in the future.

Figure 1:
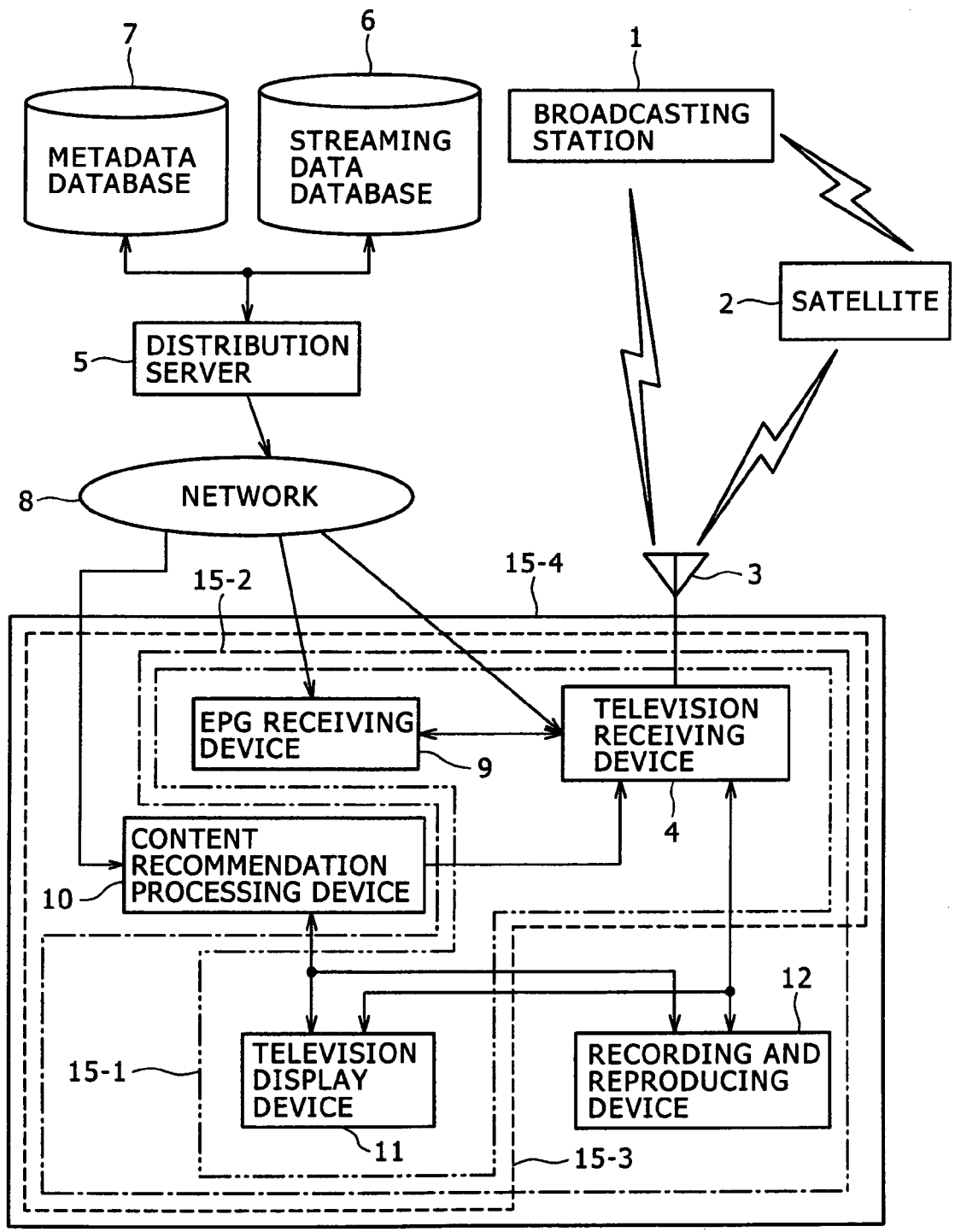
FIG. 1 is a diagram of assistance in explaining television program broadcasting and streaming data distribution.
Figure 2:
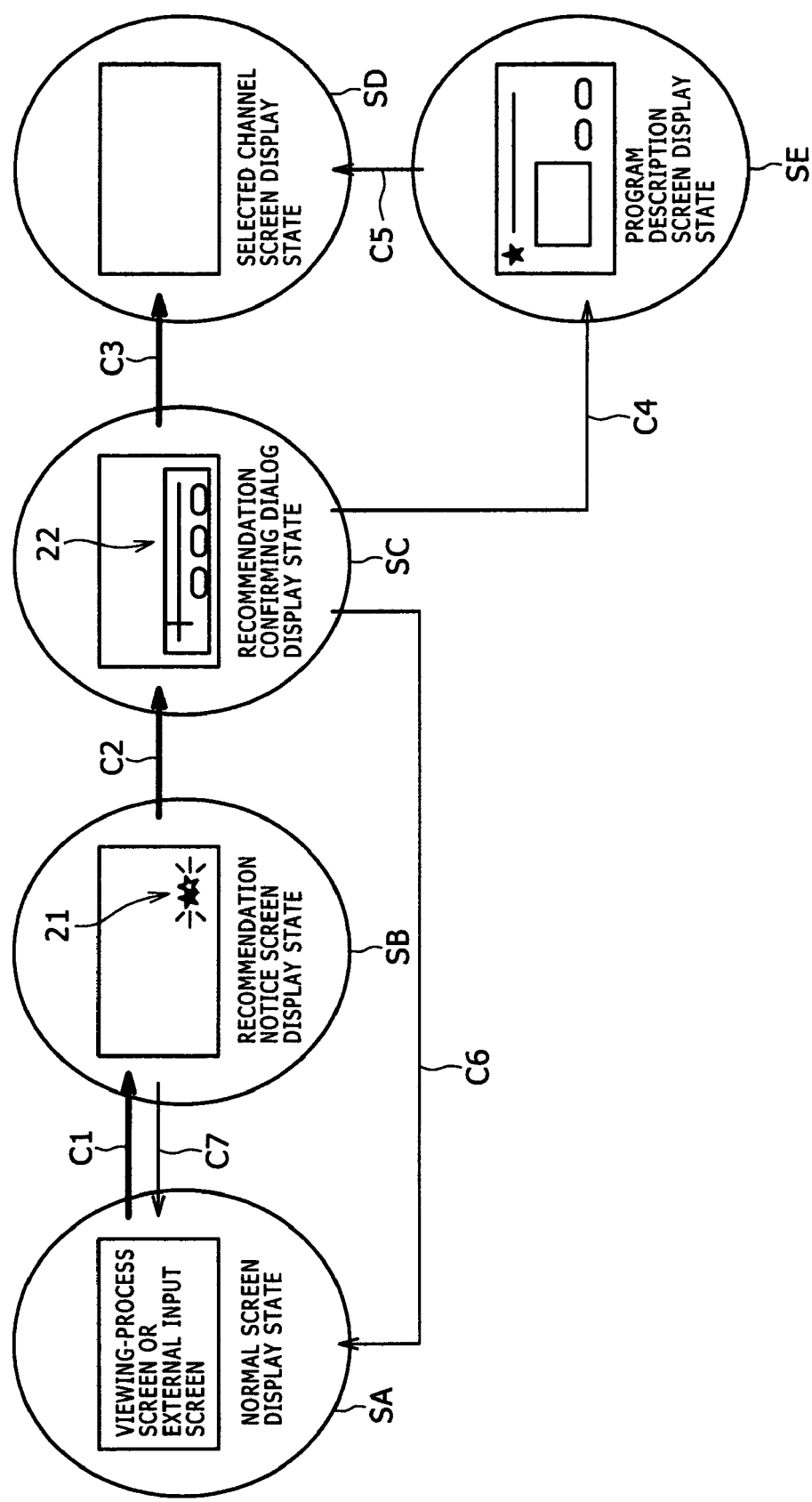
FIG. 2 is a state transition diagram showing an example of state transitions of an image displayed on the screen of a television display device 11 under control of a content recommendation processing device in FIG. 1 as an information processing apparatus to which an embodiment according to the present invention is applied.

An information processing apparatus according to an embodiment of the present invention is an information processing apparatus (for example a content recommendation processing device 10 in FIG. 1 and the content recommendation processing device 10 having a functional configuration of FIG. 11) for recommending contents, the information processing apparatus including recommendation information generating means (for example a recommendation information generating unit 131 in FIG. 11) for generating recommendation information (for example a recommendation notice 21 and a recommendation confirming dialog 22 in FIG. 2 and the like) for presenting a recommended content to be recommended to a user to the user, and when presenting the recommendation information to the user, changing a form of presentation of at least a part of the recommendation information.

The information processing apparatus further includes recommended content extracting means (for example a recommended content extracting unit 130 in FIG. 11) for setting one or more contents that are being distributed or whose distribution is to be started from one or more distribution sources (for example a broadcasting station 1 and a distribution server 5 in FIG. 1 and the like), respectively, as processing objects, and extracting one or more recommended contents from the processing objects, wherein the recommendation information generating means changes the form of presentation of at least a part of the recommendation information according to a description of a predetermined element of one or more elements related to a process of extracting the recommended content by the recommended content extracting means.

The recommendation information generating means generates first recommendation information (for example the recommendation notice 21 in FIG. 2 and FIG. 3) on the recommended content and presents the first recommendation information to the user, and when the user gives a predetermined instruction, the recommendation information generating means generates second recommendation information (for example the recommendation confirming dialog 22 in FIG. 2 and FIG. 4) having a larger amount of information than the first recommendation information on the recommended content and presents the second recommendation information to the user, whereby the form of presentation of the recommendation information is changed.

The second recommendation information (for example a recommendation confirming dialog 22 in FIG. 8) at least includes a first area for displaying content information on a predetermined one of the plurality of recommended contents and a second area for displaying information offered for an operation of changing the content information displayed in the first area.

The second recommendation information (for example a recommendation confirming dialog 22 in FIG. 9) at least includes an area for displaying a list of each piece of content information on each of the plurality of recommended contents.

A form of presentation of the second recommendation information includes a first presentation form displaying a first image (for example a recommendation confirming dialog 22A in FIG. 10) at least including a first area for displaying content information on a predetermined one of the plurality of recommended contents and a second area for displaying information offered for an operation of changing the content information displayed in the first area and a second presentation form displaying a second image (for example a recommendation confirming dialog 22B in FIG. 10) at least including a third area for displaying a list of each piece of content information on each of the plurality of recommended contents, and the recommendation information generating means presents the second recommendation information while switching between the first presentation form and the second presentation form.

Figure 5:
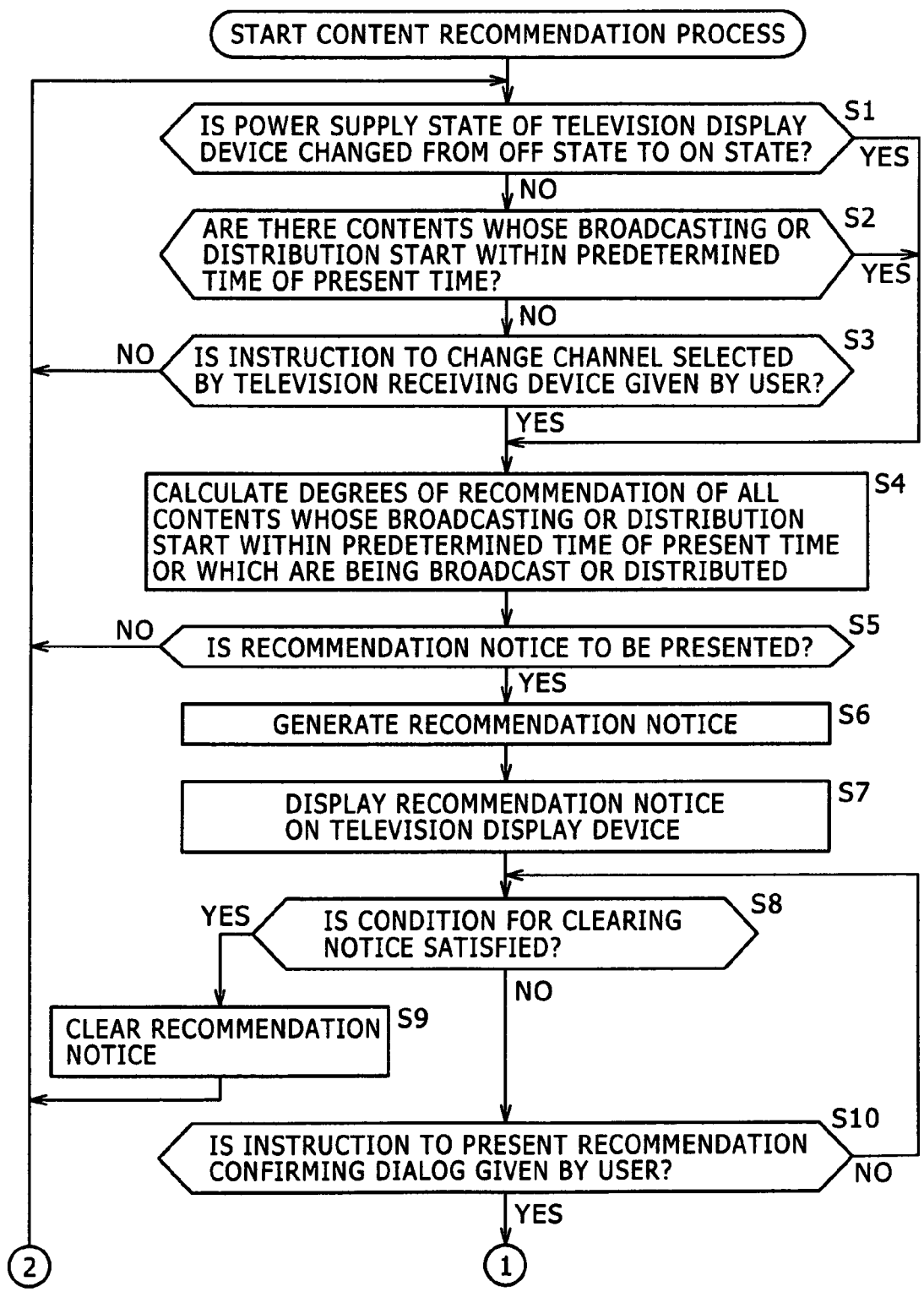
FIG. 5 is a flowchart of assistance in explaining an example of a content recommendation process performed by the content recommendation processing device in FIG. 1.
Figure 6:
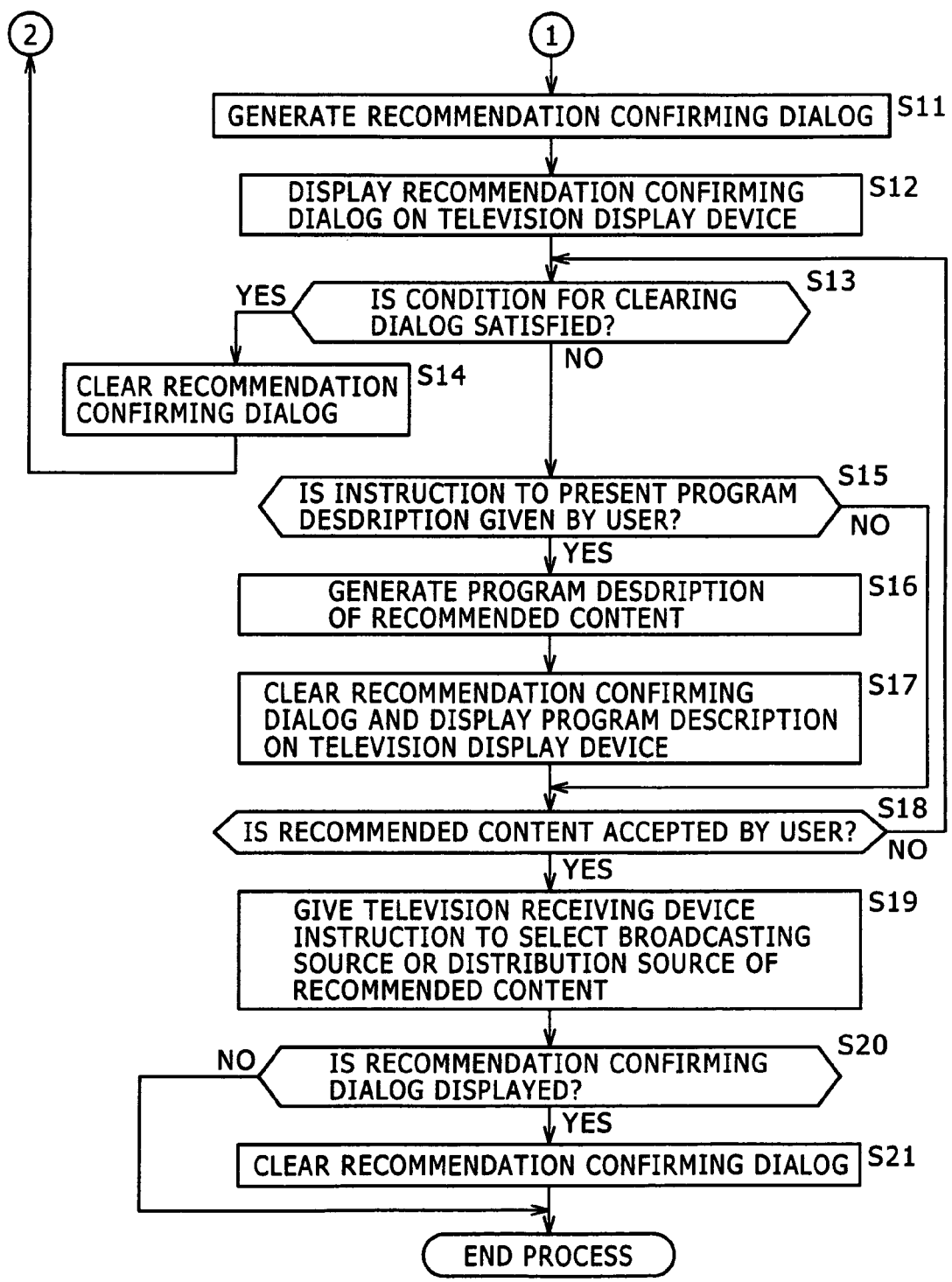
FIG. 6 is a flowchart of assistance in explaining an example of the content recommendation process performed by the content recommendation processing device in FIG. 1.

An information processing method (for example a method based on a content recommendation process of FIG. 5) of an information processing apparatus (for example the content recommendation processing device 10 in FIG. 1) for recommending contents, the information processing method including a step of generating recommendation information for presenting a recommended content to be recommended to a user to the user, and when presenting the recommendation information to the user, changing a form of presentation of at least a part of the recommendation information (for example a process of steps S6 and S7 in FIG. 5 and steps S11 and S12 in FIG. 6).

A program according to an embodiment of the present invention is a program corresponding to the information processing method according to the above-described embodiment of the present invention, and is executed by a computer of FIG. 15, for example.

Preferred embodiments of the present invention will hereinafter be described with reference to the drawings.

Television program broadcasting and streaming data distribution will first be described with reference to FIG. 1.

In a present embodiment, a television broadcast program (hereinafter abbreviated to a program as appropriate) and distribution streaming data are used as an example of contents.

A broadcasting station 1 transmits a terrestrial wave program broadcast or transmits a satellite wave program broadcast via a satellite 2. While only one broadcasting station 1 is shown in the example of FIG. 1, it is needless to say that there can be a plurality of broadcasting stations 1. An antenna 3 of a television receiving device 4 receives the terrestrial wave or satellite wave program broadcast. The broadcast signal includes EPG (Electronic Program Guide) information as required.

A distribution server 5 reads streaming data constituting contents such as video and audio or the like from a streaming data database 6, and then distributes the streaming data to the television receiving device 4 via a network 8 including the Internet and other networks. In addition, the distribution server 5 reads information including metadata on the streaming data from a metadata database 7, and then distributes the information to an EPG receiving device 9 via the network 8. Further, the distribution server 5 reads EPG information on the program broadcast from the broadcasting station 1 from the metadata database 7, and then distributes the EPG information to the EPG receiving device 9 via the network 8.

When an amount of information of the EPG information superimposed on an ordinary broadcast signal is sufficient for a process to be described later, the process may use the same information as the EPG information superimposed on the ordinary broadcast signal. When an amount of information of the EPG information superimposed on an ordinary broadcast signal is not sufficient for the process to be described later, the process may use metadata singly or in addition to the EPG information superimposed on the ordinary broadcast signal. Suppose in the following that the EPG information superimposed on an ordinary broadcast signal does not have a sufficient amount of information for the process, and that information including metadata is thus used in the present embodiment. A combination of this information and information including metadata on streaming data will be referred to collectively as EPG data.

The EPG receiving device 9 provides the distributed EPG data to the television receiving device 4.

The television receiving device 4 having a tuner selects and receives a terrestrial wave or satellite wave broadcast signal via the antenna 3 on the basis of a control signal indicating the selection of a channel which control signal is supplied from a television display device 11 having an operating input unit or a recording and reproducing device 12. In addition, the television receiving device 4 receives streaming data distributed from the distribution server 5 via the network 8, converts the streaming data into a video/audio signal in a predetermined form, and then provides the video/audio signal to the television display device 11 or the recording and reproducing device 12. Further, the television receiving device 4 is supplied with EPG data from the EPG receiving device 9, and provides the EPG data to the television display device 11 or the recording and reproducing device 12. Incidentally, when a broadcast wave received by the television receiving device 4 includes EPG data, the television receiving device 4 separates the EPG data from a program signal, and provides the EPG data and the program signal to the television display device 11 or the recording and reproducing device 12.

A content recommendation processing device 10 generates recommendation information for recommending contents matching the preference of a user among streaming data distributed or to be distributed from the distribution server 5 and television broadcast programs broadcast or to be broadcast from the broadcasting station 1 (the streaming data and the television broadcast programs will hereinafter be referred to as contents in the present embodiment), and then supplies the recommendation information to the television display device 11 and the recording and reproducing device 12. Incidentally, details of the content recommendation processing device 10 will be described later with reference to FIG. 2 and subsequent drawings. A recommendation notice 21 and a recommendation confirming dialog 22 in FIG. 2 and the like are used as the recommendation information in the present embodiment. Details of these pieces of recommendation information will also be described later with reference to FIG. 2 and subsequent drawings.

Incidentally, when a television broadcast program is regarded as one form of a content as described above, broadcasting from the broadcasting station 1 can be regarded as one form of content distribution. That is, distribution refers to the provision of a content from a predetermined distribution source not limited to the broadcasting station 1 or the distribution server 5 to a predetermined distribution destination in a predetermined form of transmission not limited to network distribution or broadcasting.

However, the description of the embodiment in FIG. 1 will be made with broadcasting from the broadcasting station 1 and distribution from the distribution server 5 being differentiated from each other. That is, expressions such as broadcasting or distribution, a broadcasting source (corresponding to the broadcasting station 1 in the example of FIG. 1) or a distribution source (corresponding to the distribution server 5 in the example of FIG. 1) and the like will be adopted.

The television display device 11 performs display and audio output of a video/audio signal supplied from the television receiving device 4 or a video/audio signal reproduced by the recording and reproducing device 12 on the basis of an operation of the operating input unit by a user, automatically sets a channel on the basis of recommendation information supplied from the content recommendation processing device 10, and displays recommendation information (a recommendation notice 21 and a recommendation confirming dialog 22 in FIG. 2 and the like to be described later). The television display device 11 supplies an operation log as a history of user operations to the content recommendation processing device 10.

The recording and reproducing device 12 records a video/audio signal supplied from the television receiving device 4 onto a recording medium loaded in the recording and reproducing device 12 or a built-in recording medium (for example a hard disk) on the basis of an operating input by the user, or automatically records a video/audio signal supplied from the television receiving device 4 onto a recording medium loaded in the recording and reproducing device 12 or the built-in recording medium on the basis of recommendation information supplied from the content recommendation processing device 10. In addition, the recording and reproducing device 12 reproduces a video/audio signal recorded on a loaded recording medium or the built-in recording medium, and then supplies the video/audio signal to the television display device 11. Further, the recording and reproducing device 12 supplies an operation log as a history of user operations to the content recommendation processing device 10.

While the EPG receiving device 9, the television receiving device 4, the content recommendation processing device 10, the television display device 11, and the recording and reproducing device 12 have been described above as different devices, these devices do not necessarily need to be formed individually. For example, the EPG receiving device 9, the television receiving device 4, and the television display device 11 may of course be formed integrally as a television receiver 15-1 including a tuner function. Further, the recording and reproducing device 12 may also be formed integrally with the television receiver 15-1 to constitute a television receiver 15-2 having a recording function. The recording and reproducing device 12 may of course be a so-called hard disk recorder having a high-capacity hard disk as a recording medium. In addition, the content recommendation processing device 10 may be included in the television receiver 15-1 including the tuner function to form a television receiver 15-3. Alternatively, the content recommendation processing device 10 may be included in the television receiver 15-2 to form a television receiver 15-4.

In addition, while the operating input unit for operating the television display device 11 may be separate from operating input units for operating other devices such as the content recommendation processing device 10 and the like, suppose that the identical operating input unit (an operating input unit 25 in FIG. 11 to be described later) is used in the present embodiment. That is, in the present embodiment, the user can operate not only the television display device 11 but also other devices such as the content recommendation processing device 10 and the like by using the single operating input unit (for example a remote control).

FIG. 2 is a state transition diagram showing an example of state transitions of an image displayed on the screen of the television display device 11 under control of the content recommendation processing device 10.

In FIG. 2, each state is represented by one elliptic block, and is distinguished by a reference including "S" which reference indicates the elliptic block. A state transition from one state to another state (including staying in a same state) is made when a predetermined condition (hereinafter referred to as a state transition condition) is satisfied. In FIG. 2, such a state transition condition is represented by a reference including "C" which reference is attached to an arrow indicating a transition from one state to another state. Incidentally, the same is true for other state transition diagrams to be described later.

In the example of FIG. 2, a basic state is a normal screen display state SA. Specifically, the normal screen display state SA is a state in which a content (a program) now being selected and received by the television receiving device 4 is displayed on the display screen of the television display device 11 or a state in which a content (a recorded program or the like) now being reproduced by the recording and reproducing device 12 is displayed on the display screen of the television display device 11. Incidentally, in FIG. 2, the screen in the former state is described as a viewing-process screen, and the screen in the latter state is described as an external input screen.

In other words, the normal screen display state SA refers to a state in which the user is viewing a predetermined content and only the predetermined content is displayed. Accordingly, the predetermined content displayed on the television display device 11 in the normal screen display state SA will hereinafter be referred to as a viewing-process content.

For example, when a present time becomes a time immediately before a start of broadcasting or distribution of a recommended content (for example five minutes before the start), it is determined that a state transition condition C1 is satisfied, and the display state of the television display device 11 makes a transition to a recommendation notice screen display state SB.

Incidentally, a more accurate concrete example of the state transition condition C1 will be described later with reference to steps S1 to S5 in FIG. 5 and the like.

When the transition to the recommendation notice screen display state SB has been made, an image 21 (hereinafter referred to as a recommendation notice 21) notifying the presence of recommended contents is displayed on the viewing-process content on the display screen of the television display device 11. Incidentally, the recommendation notice 21 is an image of a black star and a white star overlapping each other in the example of FIG. 2. In actuality, however, an image as shown in FIG. 3, for example, can be used.

Figure 3:
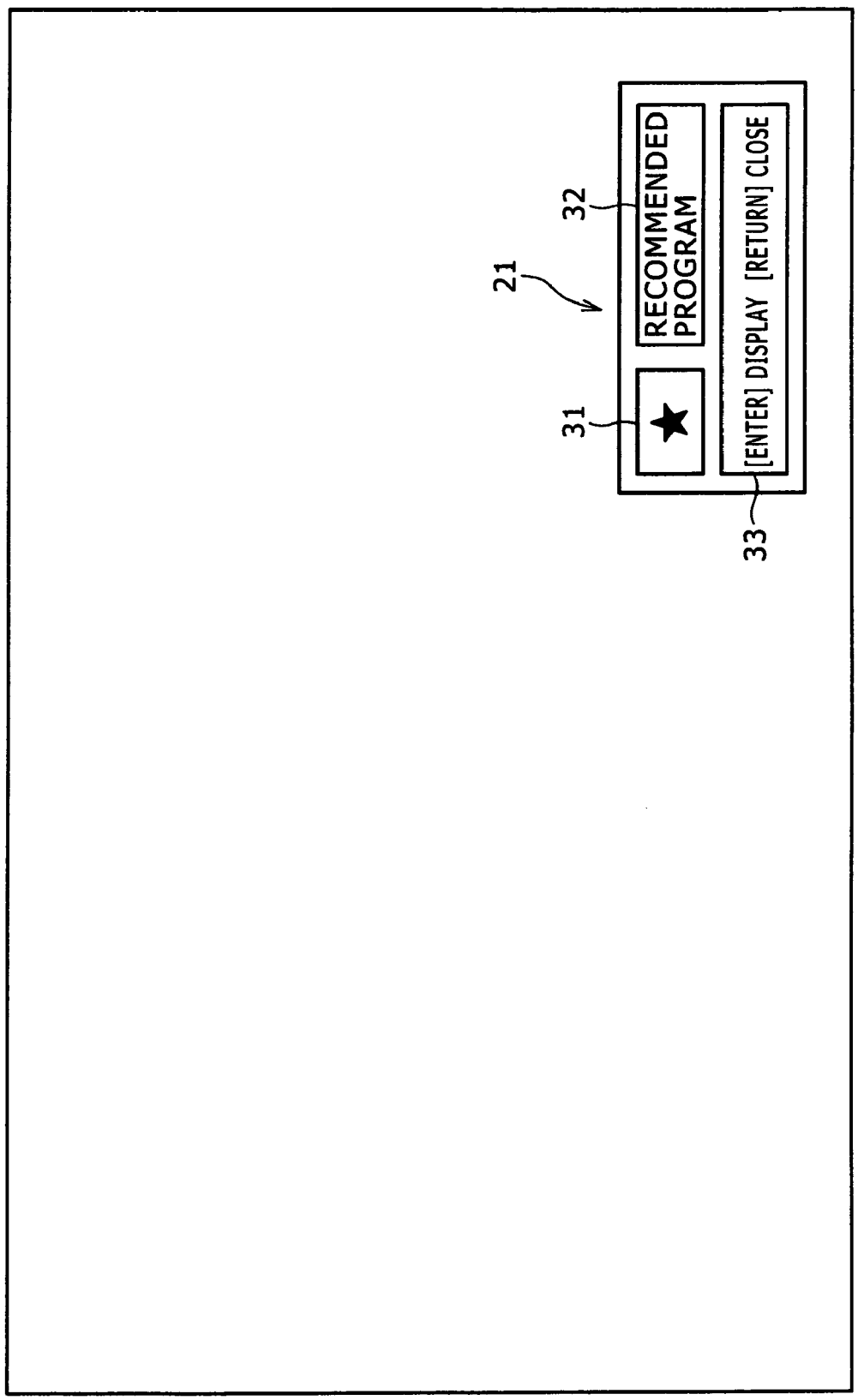
FIG. 3 is a diagram showing a recommendation notice as an example of recommendation information generated and presented by the content recommendation processing device in FIG. 1.

The recommendation notice 21 in the example of FIG. 3 includes an area 31 showing a predetermined icon (a star icon in the example of FIG. 3), an area 32 for simple display of information (text "recommended program" in the example of FIG. 3) allowing identification of a recommended content, and an area 33 for displaying information (text "[ENTER] DISPLAY [RETURN] CLOSE" in the example of FIG. 3) indicating operation contents. Incidentally, hereinafter, for simplicity of description, the area 31 may be referred to as an icon 31, the area 32 may be referred to as a message area 32, and the area 33 may be referred to as an operation guide 33.

Incidentally, the recommendation notice 21 is not limited to the example of FIG. 3, of course. Another concrete example of the recommendation notice 21 will be described later with reference to FIG. 7 and the like.

By merely visually checking such a recommendation notice 21, the user can easily recognize the presence of another broadcast program or the like that is recommended (recommended content) while viewing a broadcast program or the like (while a viewing content is displayed) without the viewing being obstructed.

When the user desires to know further information on the recommended content notified by the recommendation notice 21, the user performs a predetermined operation using the operating input unit, or, specifically, for example presses an "ENTER" key provided on the operating input unit as shown in the operation guide 33 in the example of FIG. 3, whereby an image (hereinafter referred to as a recommendation confirming dialog) including detailed information on the recommended content (the recommended program displayed in the message area 32 in the example of FIG. 3) is displayed on the screen.

That is, when an operation is performed to give an instruction to present the recommendation confirming dialog in the recommendation notice screen display state SB in FIG. 2, or for example an operation of pressing the "ENTER" key is performed in the above-described example, it is determined that a state transition condition C2 is satisfied, and the display state of the television display device 11 makes a transition to a recommendation confirming dialog display state SC.

When the transition to the recommendation confirming dialog display state SC has been made, a recommendation confirming dialog 22 is displayed on the viewing-process content on the display screen of the television display device 11. Incidentally, the recommendation confirming dialog 22 is an image in a tabular form including three ellipses in the example of FIG. 2. In actuality, however, an image as shown in FIG. 4, for example, can be used.

Figure 4:
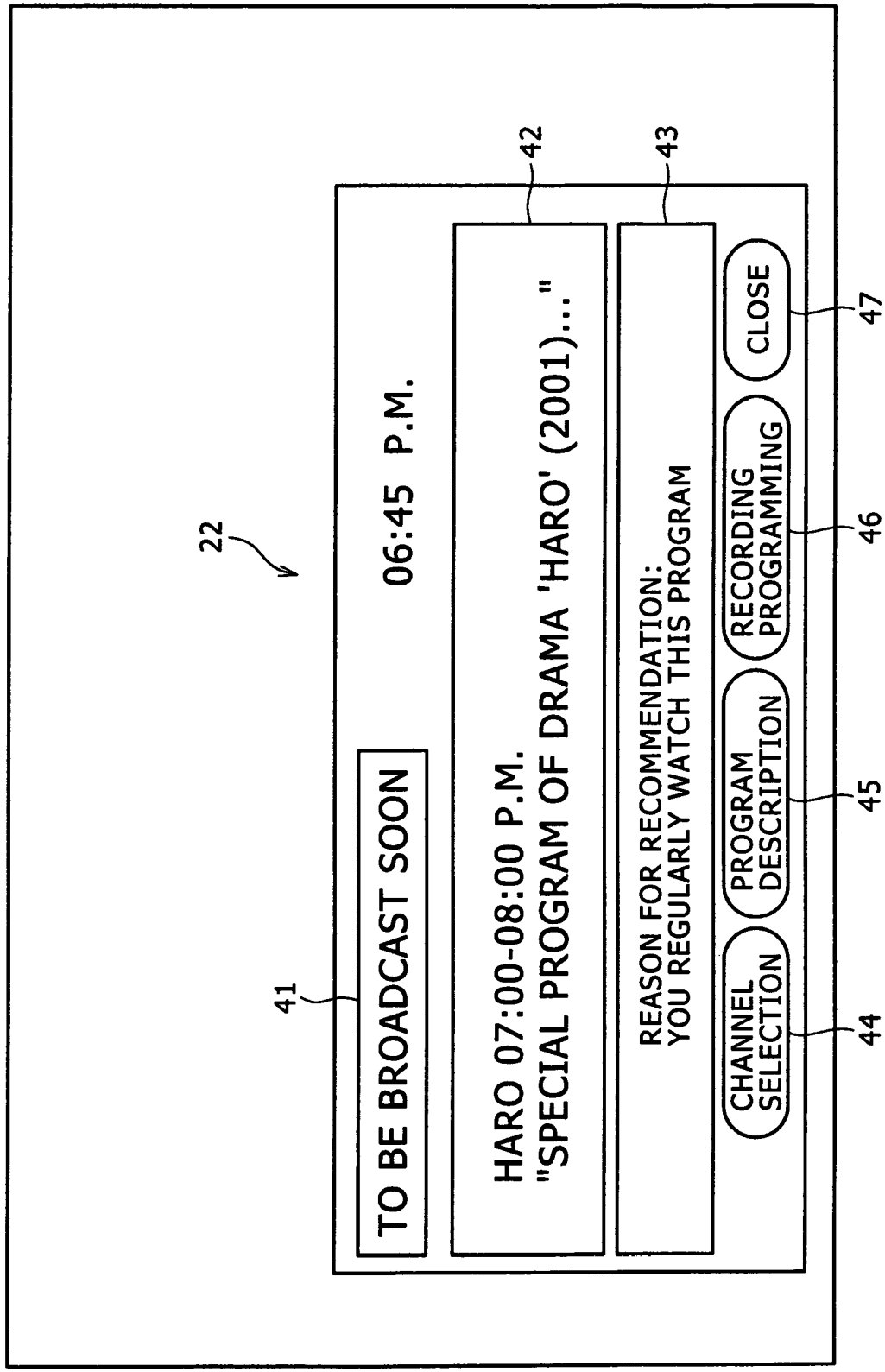
FIG. 4 is a diagram showing a recommendation confirming dialog as an example of recommendation information generated and presented by the content recommendation processing device in FIG. 1.

The recommendation confirming dialog 22 in the example of FIG. 4 includes areas 41 to 43 and software buttons 44 to 47.

The area 41 for example displays information on the state of the recommended content. Specifically, for example, when the broadcasting or distribution of the recommended content starts at a time later than the present time, text "TO BE BROADCAST SOON" is displayed, as shown in FIG. 4. On the other hand, when the recommended content is now being broadcast or distributed, text "NOW BEING BROADCAST", for example, is displayed, though not shown in FIG. 4.

The area 42 for example displays various EPG data on the recommended content. Specifically, for example, the area 42 displays information (for example a channel number or the like) indicating the broadcasting source or distribution source of the recommended content, a time ("07:00 P.M." in the example of FIG. 4) at which the broadcasting or distribution of the recommended content starts, a time ("08:00 P.M." in the example of FIG. 4) at which the broadcasting or distribution of the recommended content ends, the title ("HARO" in the example of FIG. 4) of the recommended content, the genre ("DRAMA" in the example of FIG. 4) of the recommended content, detailed information ("SPECIAL PROGRAM OF DRAMA "HARO" (2001) . . . " in the example of FIG. 4) on the recommended content, and the like.

The area 43 for example displays a reason for recommendation, a degree of recommendation or the like of the recommended content. In the example of FIG. 4, text "REASON FOR RECOMMENDATION: YOU REGULARLY WATCH THIS PROGRAM." is displayed.

In addition, text "06:45 P.M." as the present time is also displayed as information in the recommendation confirming dialog 22 in the example of FIG. 4.

The software button 44 in the example of FIG. 4 is an operation button for changing a channel selected by the television receiving device 4 to the broadcasting source or distribution source of the recommended content. Such a software button 44 will hereinafter be referred to as a channel selection button 44 so as to match the description of FIG. 4. That is, when the user accepts the presented recommendation and is to start to view the recommended content, it suffices for the user to press the channel selection button 44 by operating the operating input unit. Thereby video from the broadcasting source or distribution source of the recommended content is displayed on the screen of the television display device 11. The description "video from the broadcasting source or distribution source of the recommended content" is made because the broadcasting or distribution of the recommended content may not be started yet at a time of pressing the channel selection button 44. In such a case, when a start time thereafter arrives, the recommended content is displayed on the screen of the television display device 11.

That is, when the user performs a channel selecting operation (an operation of pressing the channel selection button 44 in the example of FIG. 4) in the recommendation confirming dialog display state SC in FIG. 2, it is determined that a state transition condition C3 is satisfied, and the display state of the television display device 11 makes a transition to a selected channel screen display state SD.

When the transition to the selected channel screen display state SD has been made, video of the broadcasting source or distribution source selected by the channel selecting operation (the operation of pressing the channel selection button 44 in the example of FIG. 4) by the user, that is, video from the broadcasting source or distribution source of the recommended content is displayed on the display screen of the television display device 11. At this time, the recommendation confirming dialog 22 is cleared.

Incidentally, when the transition to the selected channel screen display state SD has been made and the recommended content is displayed on the display screen of the television display device 11, the recommended content becomes a new viewing-process content for the user. The selected channel screen display state SD thus becomes a state in which such a recommended content is displayed as a viewing-process content, that is, a new normal screen display state SA. In this case, thereafter, immediately before a time of a start of the broadcasting or distribution of another recommended content, for example, it is determined that the state transition condition C1 is satisfied, and the display state of the television display device 11 makes a transition to the recommendation notice screen display state SB.

The software button 45 in the example of FIG. 4 is an operation button for giving an instruction to present further detailed information (hereinafter referred to as a program description) on the recommended content. Such a software button 45 will hereinafter be referred to as a program description button 45 so as to match the description of FIG. 4. That is, when the user desires to know the further information on the recommended content, it suffices for the user to press the program description button 45 by operating the operating input unit. Thereby, for example, the program description is displayed in place of the viewing-process content on the entire display screen of the television display device 11.

That is, when an operation is performed to give an instruction to present the program description in the recommendation confirming dialog display state SC in FIG. 2, or for example an operation of pressing the program description button 45 in FIG. 4 is performed in the above-described example, it is determined that a state transition condition C4 is satisfied, and the display state of the television display device 11 makes a transition to a program description screen display state SE.

When the transition to the program description screen display state SE has been made, the program description is displayed in place of the viewing-process content on the entire display screen of the television display device 11. Incidentally, while only an outline of the program description is shown in the example of FIG. 2, the program description is not limited to the example of FIG. 2, and an arbitrary image can be used for the program description. However, it is preferable that the user be able to perform a channel selecting operation (for example an operation of pressing a software button similar to the channel selection button 44 in FIG. 4) even in a state of the program description being displayed.

In this case, that is, when the user performs the channel selecting operation in the program description screen display state SE in FIG. 2, it is determined that a state transition condition C5 is satisfied, and the display state of the television display device 11 makes a transition to the selected channel screen display state SD.

As described above, when the transition to the selected channel screen display state SD has been made, video of the broadcasting source or distribution source selected by the channel selecting operation by the user, that is, video from the broadcasting source or distribution source of the recommended content is displayed on the display screen of the television display device 11.

The software button 46 in the example of FIG. 4 is an operation button for giving an instruction to program the recording of the recommended content. Such a software button 46 will hereinafter be referred to as a recording programming button 46 so as to match the description of FIG. 4. That is, when the user accepts the presented recommendation and is to give an instruction to program the recording of the recommended content, it suffices for the user to press the recording programming button 46 by operating the operating input unit. Thereby the instruction to program the recording is given to the recording and reproducing device 12 in FIG. 1. Then, when a time of a start of the broadcasting or distribution of the recommended content arrives, the recording and reproducing device 12 starts an operation of recording the recommended content, that is, starts recording a video/audio signal corresponding to the recommended content supplied from the television receiving device 4 onto a recording medium.

The software button 47 in the example of FIG. 4 is an operation button for giving an instruction to clear the recommendation confirming dialog 22. Such a software button 47 will hereinafter be referred to as a close button 47 so as to match the description of FIG. 4. That is, when the user does not accept the presented recommendation, it suffices for the user to press the close button 47 by operating the operating input unit. Thereby, the recommendation confirming dialog 22 is cleared, and only the viewing-process content is displayed on the display screen of the television display device 11.

That is, when an operation is performed to give an instruction to clear the recommendation confirming dialog 22 in the recommendation confirming dialog display state SC in FIG. 2, or specifically for example an operation of pressing the close button 47 in FIG. 4 is performed in the above-described example, it is determined that a state transition condition C6 is satisfied, and the display state of the television display device 11 makes a transition to the normal screen display state SA.

Incidentally, also in the case where the recommendation notice 21 is being displayed, when the user does not accept the recommendation, the user can perform an operation of clearing the recommendation notice, or specifically for example press a "RETURN" key provided on the operating input unit as shown in the operation guide 33 in the example of FIG. 3, to thereby clear the recommendation notice 21.

That is, when an operation is performed to give an instruction to clear the recommendation notice 21 in the recommendation notice screen display state SB in FIG. 2, or for example an operation of pressing the "RETURN" key is performed in the above-described example, it is determined that a state transition condition C7 is satisfied, and the display state of the television display device 11 makes a transition to the normal screen display state SA.

The process realizable by application of an embodiment according to the present invention has been described above from a viewpoint of display states of the television display device 11. In the following, from a different viewpoint, such a process will be described as a process of the content recommendation processing device 10 in FIG. 1. Such a process of the content recommendation processing device 10 will hereinafter be referred to as a content recommendation process.

FIG. 5 and FIG. 6 are flowcharts of assistance in explaining an example of the content recommendation process.

In step S1, the content recommendation processing device 10 determines whether the power supply state of the television display device 11 is changed from an off state to an on state.

When the power supply state of the television display device 11 is changed from the off state to the on state, a result of determination in the process of step S1 is YES. The process then proceeds to step S4. However, a process of step S4 and subsequent steps will be described later.

On the other hand, when the power supply state of the television display device 11 continues being the on state, for example, a result of determination in the process of step S1 is NO. The process then proceeds to step S2.

In step S2, the content recommendation processing device 10 determines whether there are contents whose broadcasting or distribution start within a predetermined time (for example five minutes) of the present time.

When there are contents whose broadcasting or distribution start within the predetermined time of the present time, a result of determination in the process of step S2 is YES. The process then proceeds to step S4. However, the process of step S4 and subsequent steps will be described later.

On the other hand, when there are no contents whose broadcasting or distribution start within the predetermined time of the present time, a result of determination in the process of step S2 is NO. The process then proceeds to step s3.

In step S3, the content recommendation processing device 10 determines whether an instruction to change the channel selected by the television receiving device 4 is given by the user.

When it is determined that an instruction to change the channel selected by the television receiving device 4 is given by the user, a result of determination in the process of step S3 is YES. The process then proceeds to step S4. However, the process of step S4 and subsequent steps will be described later.

On the other hand, when it is determined that an instruction to change the channel selected by the television receiving device 4 is not given by the user, a result of determination in the process of step S3 is NO. The process then returns to step S1 to repeat the process from step S1 on down.

That is, in the example of FIG. 5 and FIG. 6, the loop process of steps S1 to S3 is repeated until one of three conditions is satisfied, the three conditions being a first condition that the power supply state of the television display device 11 be changed from the off state to the on state, a second condition that there be contents whose broadcasting or distribution starts within the predetermined time (for example five minutes) of the present time, and a third condition that an instruction to change the channel selected by the television receiving device 4 be given by the user. When one of the conditions is satisfied, the process proceeds to step S4.

In step S4, the content recommendation processing device 10 calculates degrees of recommendation of all contents whose broadcasting or distribution starts within the predetermined time (for example five minutes) of the present time or which are being broadcast or distributed.

It is to be noted that the content recommendation processing device 10 calculates the degrees of recommendation using various preference information (including preferences of other people) rather than calculating the degrees of recommendation from only EPG data.

A history of viewing of the user, for example, can be used as preference information. Specifically, for example, selected broadcasting stations and distribution servers (so-called channel names or the like), time periods, titles, genres, program details and the like can be used as preference information. In addition, a history of operation of the user can be used as preference information. Specifically, for example, a history of operation of "channel selection" and a history of operation of checking the above-described recommendation information, that is, the recommendation notice 21, the recommendation confirming dialog 22, the program description and the like (see FIG. 2 and the like) can be used as preference information. In addition, for example, user evaluations can be used as preference information. Specifically, for example, evaluations such as a low rating for a program whose viewing is discontinued, a high rating for a program designated as a favorite, and the like can be used as preference information. In addition, for example, a keyword or the like registered by the user can be used as preference information.

Further, for example, information obtained via the network can be used as preference information. Specifically, for example, audience ratings, popularity rankings and the like can also be used as preference information. Being able to use such preference information refers to the expression in the parentheses following the above preference information, that is, "including preferences of other people".

By thus recommending contents utilizing not only EPG data but also preference information, the recommended contents can be presented to the user effectively. That is, because preference information is used, as compared with a case where only EPG data is used, it is possible to present contents that match preferences of the user more, and prevent the presentation of contents unnecessary for the user. In addition, when the recommended contents are presented, it is possible not only to present information based on mere EPG data but also to present a degree of the recommendation and a reason for the recommendation. Thus, as compared with the case where only EPG data is used, the recommended contents can be presented more convincingly.

Incidentally, further details about the calculation of a degree of recommendation by the content recommendation processing device 10 will be described later with reference to FIG. 11 and subsequent figures.

After the degrees of recommendation of all the contents as processing objects in step S4 are calculated, the process proceeds to step S5.

In step S5, the content recommendation processing device 10 determines whether to present the recommendation notice 21 (FIG. 2 and the like).

While there is no particular limitation to a criterion for the determination in step S5, suppose in this case that a criterion is adopted such that it is determined that the recommendation notice 21 is to be presented when there is one or more contents having a degree of recommendation equal to or higher than a predetermined threshold value. That is, in this case, contents having a degree of recommendation equal to or higher than the predetermined threshold value are presented as recommended contents.

Hence, when the degrees of recommendation of all the contents are lower than the threshold value, that is, there is not a single recommended content, a result of determination in the process of step S5 is NO. The process then returns to step S1 to repeat the process from step S1 on down.

On the other hand, when there is one or more contents having a degree of recommendation equal to or higher than the threshold value, that is, when there is one or more recommended contents, a result of determination in the process of step S5 is YES. The process then proceeds to step S6.

The content recommendation processing device 10 generates the recommendation notice 21 in step S6, and displays the recommendation notice 21 on the television display device 11 in step S7. Thereby the process proceeds to step S8.

The process of steps S1 to S7 in FIG. 5 is compared with the state transition diagram of FIG. 2 in the following.

In FIG. 5, the recommendation notice 21 is generated and displayed in the process of steps S6 and S7 when one of the first condition, the second condition, and the third condition is satisfied, the first condition specifying that the power supply state of the television display device 11 be changed from the off state to the on state (the first condition that a result of the process of step S1 be YES), the second condition specifying that there be contents whose broadcasting or distribution starts within the predetermined time (for example five minutes) of the present time (the second condition that a result of the process of step S2 be YES), and the third condition specifying that an instruction to change the channel selected by the television receiving device 4 be given by the user (the third condition that a result of the process of step S3 be YES), and a fourth condition is satisfied, the fourth condition specifying that there be one or more contents having a degree of recommendation equal to or higher than the threshold value among all the contents whose broadcasting or distribution starts within the predetermined time (for example five minutes) of the present time or which are being broadcast or distributed, that is, that there be one or more recommended contents (the condition that a result of the process of step S5 after the process of step S4 be YES).

Hence, in the content recommendation process of FIG. 5, satisfying one of the above-described first to third conditions and satisfying the fourth condition corresponds to satisfying the state transition condition C1 in FIG. 2.

In other words, the flowchart of FIG. 5 shows an example of the content recommendation process when the above-described first to fourth conditions are used as the state transition condition C1. That is, steps S1 to S5 in FIG. 5 are an example of a process of determining whether the state transition condition C1 is satisfied. Hence, when another condition is used as the state transition condition C1, it suffices to use a process of determining whether the other condition is satisfied in place of steps S1 to S5 in FIG. 5.

For example, while the power supply state of the television display device 11 is determined in the determination process of step S1, the power supply state of the television receiving device 4 as another device may be determined, or in a wide range of cases, the power supply state of a device offered for the user to use contents may be determined. That is, in the present embodiment, because video contents are mainly broadcast or distributed as contents, the use of contents means the viewing of video contents, and the television display device 11 and the television receiving device 4 are used as an example of a device offered for the viewing. In addition, the state to be determined is not limited to the power supply state, and in a wide range of cases, a state of a device being able to exert a function of the device may be used. That is, the determination process in step S1 is an example of a determination process of determining whether "the state of a device offered for the user to use contents has become a state of the device being able to exert a function of the device".

In any case, after the state transition condition C1 is satisfied and a transition is made to the recommendation notice screen display state SB, that is, after the recommendation notice 21 is generated and displayed in the process of steps S6 and S7 in the example of FIG. 5, the process proceeds to step S8.

In step S8, the content recommendation processing device 10 determines whether a condition for clearing the notice is satisfied. That is, the condition for clearing the notice in this case corresponds to the state transition condition C7 in FIG. 2.

For example, when the recommendation notice 21 in the example of FIG. 3 is displayed, and the "RETURN" key on the operating input unit is pressed, it is determined in step S8 that the condition for clearing the notice is satisfied, that is, a result of determination in step S8 is YES. The process then proceeds to step S9. In step S9, the content recommendation processing device 10 clears the recommendation notice 21. The process thereafter returns to step S1 to repeat the process from step S1 on down. That is, in FIG. 2, it is determined that the state transition condition C7 is satisfied, and a transition is made to the normal screen display state SA.

On the other hand, as long as the "RETURN" key on the operating input unit is not pressed, a result of determination in step S8 is NO. The process then proceeds to step S10.

In step S10, the content recommendation processing device 10 determines whether an instruction to present the recommendation confirming dialog 22 is given by the user. That is, the determination condition in step S10 corresponds to the state transition condition C2 in FIG. 2.

For example, when the recommendation notice 21 in the example of FIG. 3 is displayed, and the "ENTER" key on the operating input unit is pressed, a result of determination in step S10 is YES. The process then proceeds to step S11 in FIG. 6. The content recommendation processing device 10 generates the recommendation confirming dialog 22 in step S11, and has the recommendation confirming dialog 22 displayed on the television display device 11 in step S12. Thereby the process proceeds to step S13. That is, in FIG. 2, the state transition condition C2 is satisfied, and a transition is made to the recommendation confirming dialog display state SC.

On the other hand, as long as the "ENTER" key on the operating input unit is not pressed, a result of determination in step S10 in FIG. 5 is NO. The process then returns to step S8 to repeat the process from step S8 on down. That is, in this case, as long as the "RETURN" key or the "ENTER" key on the operating input unit is not pressed, a loop process of steps S8 and S10 is repeated, and the display of the recommendation notice 21 is maintained. That is, in FIG. 2, the recommendation notice screen display state SB is maintained.

However, without depending only on operation of the user, for example, when a certain time (for example 10 seconds) has passed after a start of the display of the recommendation notice 21, it may be determined in step S8 that the condition for clearing the notice is satisfied, and the recommendation notice 21 may be cleared in step S9. In other words, the condition for clearing the notice, that is, the state transition condition C7 in FIG. 2 is not particularly limited, and an arbitrary combination of an arbitrary number of conditions of arbitrary kinds can be used.

Description will be made below of a process after a transition is made to the recommendation confirming dialog display state SC in FIG. 2, that is, a process in step S13 and subsequent steps in FIG. 6.

As described above, when the recommendation confirming dialog 22 has been displayed in the process of step S12, the process proceeds to step S13.

In step S13, the content recommendation processing device 10 determines whether a condition for clearing the dialog is satisfied. That is, the condition for clearing the dialog corresponds to the state transition condition C6 in FIG. 2.

For example, when the recommendation confirming dialog 22 in the example of FIG. 4 is displayed, and the close button 47 is pressed, it is determined in step S13 that the condition for clearing the dialog is satisfied. The process then proceeds to step S14. In step S14, the content recommendation processing device 10 clears the recommendation confirming dialog 22. The process thereafter returns to step S1 in FIG. 5 to repeat the process from step S1 on down. That is, in FIG. 2, it is determined that the state transition condition C6 is satisfied, and a transition is made to the normal screen display state SA.

Incidentally, as with the condition for clearing the notice in step S8 in FIG. 5 described above (the state transition condition C7 in FIG. 2), the condition for clearing the dialog in step S13 (the state transition condition C6 in FIG. 2) is not particularly limited, and an arbitrary combination of an arbitrary number of conditions of arbitrary kinds can be used.

Specifically, for example, in addition to the pressing of the close button 47, the pressing of the "RETURN" key on the operating input unit or the passage of a predetermined time (for example 20 seconds) in a state of non-operation can be used as the condition for clearing the dialog in step S13 (the state transition condition C6 in FIG. 2).

In any case, as long as the condition for clearing the dialog in step S13 (the state transition condition C6 in FIG. 2) is not satisfied, a result of determination in step S13 is NO. The process then proceeds to step S15. In step S15, the content recommendation processing device 10 determines whether an instruction to present a program description is given by the user.

For example, when the recommendation confirming dialog 22 in the example of FIG. 4 is displayed, and the program description button 45 is pressed, it is determined in step S15 that an instruction to present a program description is given by the user. The process then proceeds to step S16. The content recommendation processing device 10 generates a program description (see an image in the program description screen display state SE in FIG. 2) for a recommended content in step S16, and clears the recommendation confirming dialog 22 and then makes the program description displayed on the television display device 11 in step S17. Thereby the process proceeds to step S18. That is, in FIG. 2, the state transition condition C4 is satisfied, and a transition is made to the program description screen display state SE.

When the program description button 45 is not pressed, a result of the process of step S15 is NO. The process then proceeds to step S18.

In step S18, the content recommendation processing device 10 determines whether the recommended content is accepted by the user.

In this case, when a channel selecting operation (an operation of pressing the channel selection button 44 in the example of FIG. 4) is performed, it is determined that the recommended content is accepted by the user. That is, the determination condition of step S18 corresponds to the state transition condition C3 or C5 in FIG. 2.

That is, a case where a result of determination in step S18 is YES corresponds to a case where the state transition condition C3 or C5 in FIG. 2 is satisfied. A process of steps S19 to S21 is performed as follows as a process for a transition to the selected channel screen display state SD in FIG. 2.

In step S19, the content recommendation processing device 10 gives the television receiving device 4 in FIG. 1 an instruction to select the broadcasting source or distribution source of the recommended content. That is, a so-called channel changing instruction is given to the television receiving device 4.

In step S20, the content recommendation processing device 10 determines whether the recommendation confirming dialog 22 is displayed.

When a result of the process of step S18 is YES after NO is obtained as a result of determination in the process of step S15, that is, when an operation of pressing the channel selection button 44 in FIG. 4 is performed in the recommendation confirming dialog display state SC in FIG. 2, for example, a result of determination in step S20 after the process of step S19 is YES. The process then proceeds to step S21. In step S21, the content recommendation processing device 10 clears the recommendation confirming dialog 22. Thereby, video of the broadcasting source or distribution source selected by the channel selecting operation (the operation of pressing the channel selection button 44 in the example of FIG. 4) by the user, that is, video from the broadcasting source or distribution source of the recommended content is displayed on the display screen of the television display device 11. As a result, the content recommendation process is ended.

On the other hand, when a result of the process of step S15 is YES, and a result of the process of step S18 after the process of steps S16 and S17 is YES, that is, when the channel selecting operation is performed in the program description screen display state SE in FIG. 2, the recommendation confirming dialog 22 is already cleared (see step S17), and therefore a result of determination in step S20 after the process of step S19 is NO. Then the content recommendation process is ended. Also in this case, video of the broadcasting source or distribution source selected by the channel selecting operation by the user, that is, video from the broadcasting source or distribution source of the recommended content is displayed.

Incidentally, as described above, when the recommended content is displayed on the display screen of the television display device 11, the recommended content becomes a new viewing-process content for the user. The selected channel screen display state SD thus becomes a state in which such a recommended content is displayed as a viewing-process content, that is, a new normal screen display state SA in FIG. 2. In this case, when the state transition condition C1 is thereafter satisfied, the display state of the television display device 11 makes a transition to the recommendation notice screen display state SB. That is, when the recommended content is displayed as a viewing-process content on the display screen of the television display device 11, a new content recommendation process is started.

In other words, when the recommended content is displayed on the display screen of the television display device 11 and the content recommendation process in FIG. 5 and FIG. 6 is ended, another content recommendation process is started again.

As described above, the recommendation notice 21 and the recommendation confirming dialog 22 can be presented to the user while the user is viewing a predetermined content (broadcast program or the like) and immediately before the broadcasting or distribution of a recommended content is started or while the recommended content is being broadcast or distributed. Thereby the user can recognize the presence of the recommended content and perform an operation such as channel selection or the like when accepting the recommendation.

Thus, preferably, the recommendation notice 21 and the recommendation confirming dialog 22 are presented to the user effectively. That is, forms of presentation of the recommendation notice 21 and the recommendation confirming dialog 22 are not particularly limited to the above-described examples, but the recommendation notice 21 and the recommendation confirming dialog 22 can take various forms. Examples of several presentation forms will be described in the following.

For example, the recommendation notice 21 and the recommendation confirming dialog 22 may be changed according to recommendation elements.

The recommendation elements refer to elements used in the calculation of degrees of recommendation of contents (see the process of step S4 in FIG. 5) in the content recommendation processing device 10 in FIG. 1 and elements originating from calculation results.

Specifically, for example, preference information is an example of a recommendation element.

That is, different kinds of preference information used in the calculation of degrees of recommendation can result in different degrees of recommendation or different recommendation reasons. In such a case, for example, it is possible to prepare a format of the recommendation notice 21 and the recommendation confirming dialog 22 suitable for each kind of preference information separately, generate the recommendation notice 21 and the recommendation confirming dialog 22 according to a format for a kind of preference information used in the calculation of degrees of recommendation, and present the recommendation notice 21 and the recommendation confirming dialog 22 to the user.

In addition, for example, even when the format itself is the same, the displayed contents of the recommendation notice 21 and the recommendation confirming dialog 22 can be changed according to kinds of preference information, or even when the same kind of preference information is used, the displayed contents of the recommendation notice 21 and the recommendation confirming dialog 22 can be changed according to a result of degrees of recommendation or a recommendation reason based on the preference information.

In addition, for example, there may be a plurality of users. Specifically, for example, when a system including the EPG receiving device 9, the television receiving device 4, the content recommendation processing device 10, the television display device 11, and the recording and reproducing device 12 in FIG. 1 is installed in a house, each of a plurality of residents living together in the house, for example a father, a mother, a child and the like can be a user. In this case, preference information is provided individually for each of the plurality of users. Hence, the user is also an example of a recommendation element.

In this case, for example, a recommendation notice 21 and a recommendation confirming dialog 22 that are exclusive to each of the users can be generated and presented. In this case, "exclusive" refers to cases including a case where the format itself is exclusive, a case where although the format is identical, the displayed contents are changed to exclusive contents, and the like.

In addition, for example, degrees of recommendation are also an example of a recommendation element. Specifically, there are various kinds of recommended contents: some contents have a high degree of recommendation, some contents have a middle degree of recommendation, and other contents have a low degree of recommendation, for example. Thus degrees of recommendation are not necessarily the same. Accordingly, the recommendation notice 21 and the recommendation confirming dialog 22 can each be generated and presented according to degrees of recommendation.

In addition, for example, recommendation reasons and recommended contents are also an example of a recommendation element. For example, various information such as contents having a title viewed regularly, contents matching a keyword, contents having a high audience rating, and the like can be used for recommendation reasons and recommended contents. In this case, the recommendation notice 21 and the recommendation confirming dialog 22 can each be generated and presented according to recommendation reasons and recommended contents.

Further description will be made below of various examples of forms of individual presentation of each of the recommendation notice 21 and the recommendation confirming dialog 22.

Description will first be made of examples of forms of presentation of the recommendation notice 21.

For example, the recommendation notice 21 can be presented in a different color according to a recommendation element or the like. Specifically, for example, when three degrees of recommendation for most recommended contents, normal contents, and contents just in case are used as a recommendation element, the recommendation notice 21 can be displayed in a color of gold when a recommended content is a most recommended content, the recommendation notice 21 can be displayed in a color of silver when the recommended content is a normal content, and the recommendation notice 21 can be displayed in a color of copper when the recommended content is a content just in case. The color may be changed in the whole of the recommendation notice 21 or a part of the recommendation notice 21. In the latter case, only the color of the icon 31 in FIG. 3 may be changed, for example.

For example, the recommendation notice 21 can be presented in a different size according to a recommendation element or the like. Specifically, for example, when three degrees of recommendation for most recommended contents, normal contents, and contents just in case are used as a recommendation element, the recommendation notice 21 can be displayed in a large size when a recommended content is a most recommended content, the recommendation notice 21 can be displayed in a normal size when the recommended content is a normal content, and the recommendation notice 21 can be displayed in a small size when the recommended content is a content just in case. The size may be changed in the whole of the recommendation notice 21 or a part of the recommendation notice 21.

For example, the recommendation notice 21 can be presented in a different form according to a recommendation element or the like. Specifically, for example, when three degrees of recommendation for most recommended contents, normal contents, and contents just in case are used as a recommendation element, the recommendation notice 21 in the form of a double circle (the recommendation notice 21 including the icon 31 and the areas 32 and 33 in FIG. 3 in the inner circle) can be displayed when a recommended content is a most recommended content, the recommendation notice 21 in the form of a single circle (the recommendation notice 21 including the icon 31 and the areas 32 and 33 in FIG. 3 in the circle) can be displayed when the recommended content is a normal content, and the recommendation notice 21 in the form of a triangle (the recommendation notice 21 including the icon 31 and the areas 32 and 33 in FIG. 3 in the triangle) can be displayed when the recommended content is a content just in case. The form may be thus changed in the whole of the recommendation notice 21 or a part of the recommendation notice 21. For example, a double circle icon 31 may be displayed when the recommended content is a most recommended content, a single circle icon 31 may be displayed when the recommended content is a normal content, and a triangle icon 31 may be displayed when the recommended content is a content just in case.

For example, when there is a recommendation reason, the recommendation reason may be presented in a state of being included in the recommendation notice 21. Specifically, in addition to the areas 32 and 33 in FIG. 3, a new area not shown in the figure may be provided, and a recommendation reason such as "contents having a title viewed regularly", "contents matching a keyword", "contents having a high audience rating", and the like may be displayed in the new area.

Conversely, for example, the display contents of the recommendation notice 21 may be changed according to recommendation reasons. Specifically, for example, when a recommendation reason is "contents having a title viewed regularly", it is understood that the recommendation reason or the like does not need to be presented to the user, and the recommendation notice 21 can be presented in the form of FIG. 3. On the other hand, when the recommendation reason is "contents matching a keyword", "contents having a high audience rating" or the like, a recommendation notice 21 formed by adding an area for displaying these recommendation reasons to the form of FIG. 3 can be presented.

In addition, for example, the recommendation notice 21 can be presented in a different blinking state according to a recommendation element or the like. Specifically, for example, when three degrees of recommendation for most recommended contents, normal contents, and contents just in case are used as a recommendation element, the recommendation notice 21 can be displayed by blinking twice when a recommended content is a most recommended content, the recommendation notice 21 can be displayed by blinking once when the recommended content is a normal content, and the recommendation notice 21 can be displayed without blinking when the recommended content is a content just in case. Further, the blinking state may be changed in the whole of the recommendation notice 21 or a part of the recommendation notice 21. In the latter case, only the blinking state of the icon 31 in FIG. 3 may be changed, for example.

As described above, the recommendation notice 21 is displayed on the content being viewed. Thus, it is preferable to change the display form of the recommendation notice 21 so as not to obstruct the viewing of the content being viewed by the user and surely make the user notice the recommendation notice 21.

For example, the recommendation notice 21 may be displayed as an animation.

Figure 7:
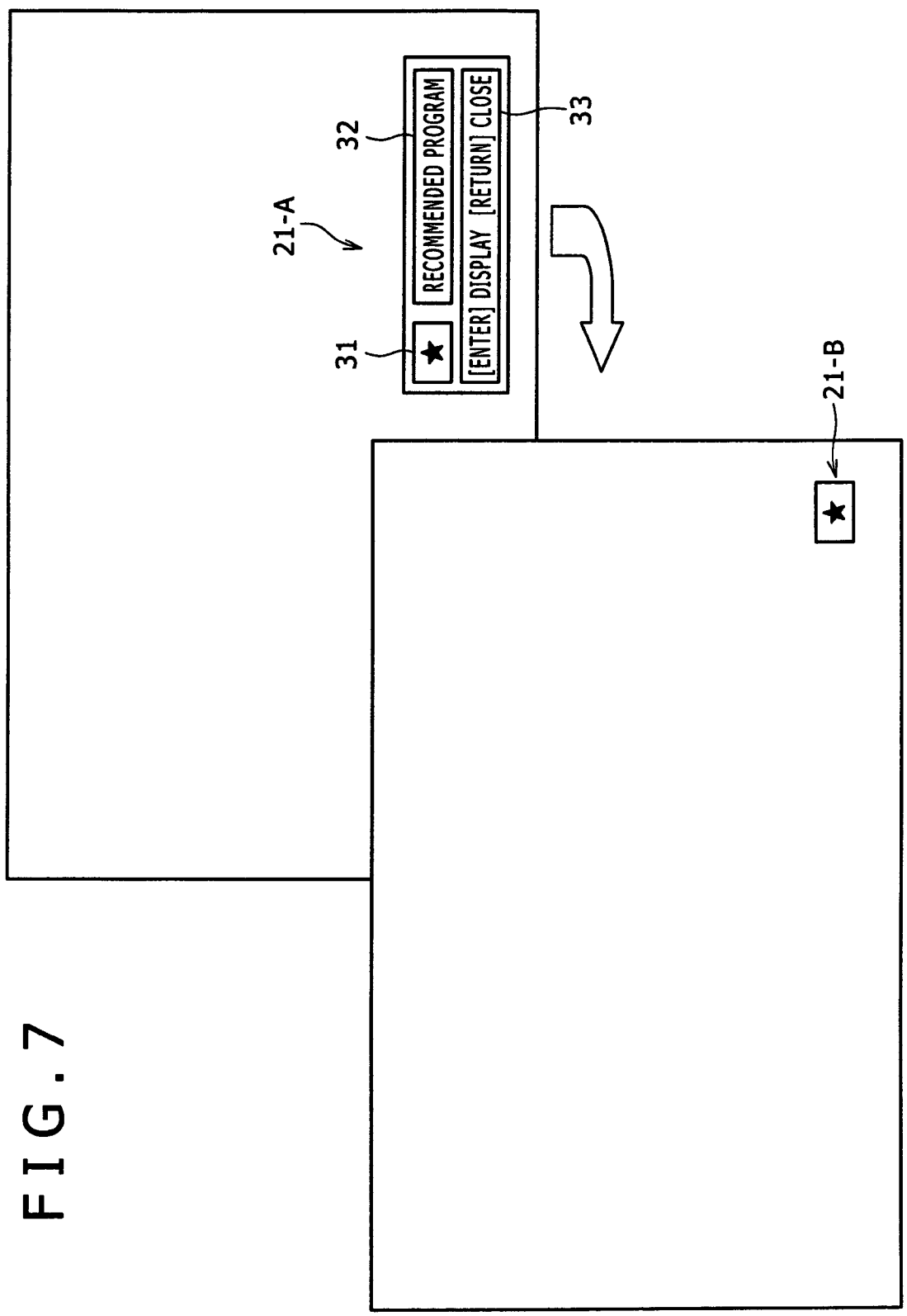
FIG. 7 is a diagram of assistance in explaining a variation of the form of presentation of the recommendation notice in FIG. 3.

Specifically, for example, the recommendation notice 21 may be displayed while the size of the recommendation notice 21 is reduced in multiple steps (including a sequence of infinite steps). Specifically, for example, FIG. 7 shows an example in which the recommendation notice 21 is displayed while the size of the recommendation notice 21 is reduced in two steps.

At a point in time at which the state transition condition C1 in FIG. 2 is satisfied and a transition is thus made to the recommendation notice screen display state SB, a recommendation notice 21-A of a certain size is displayed with a main objective of making the user notice that there is a recommended content. In this case, because of the certain size, not only the icon 31 but also the message area 32 and the operation guide 33 can be included and displayed in the recommendation notice 21-A. That is, the recommendation notice 21-A in the example of FIG. 7 corresponds to the recommendation notice 21 in the example of FIG. 3 described above.

On the other hand, for a subsequent period (for example five seconds) during which the operating input unit is expected to be operated, a recommendation notice 21-B of a minimum size such that the user knows that operation on the recommendation notice 21 is still valid is displayed with a main objective of not obstructing the viewing of the content being viewed. Specifically, in the example of FIG. 7, only the icon 31 in the recommendation notice 21-A is displayed as the recommendation notice 21-B.

Incidentally, repeating the same description, steps in which the size of the recommendation notice 21 is changed is not limited to two steps, but may be arbitrary including infinite steps. That is, the recommendation notice 21 may be displayed in such a manner as to be decreased in size continuously and gradually.

In addition, as described above, the recommendation notice 21 can be displayed in a blinking state in such a manner as not to obstruct the viewing of the content being viewed and with an objective of surely making the user notice the recommendation notice 21. In this case, when combined with a presentation in accordance with a recommendation element or the like, the recommendation notice 21 may be made to blink for any recommended content, and the number of times, speed or the like of the blinking may be changed according to the recommendation element or the like.

In addition, for example, the presentation form of the recommendation notice 21 is not limited to image display, and the recommendation notice 21 may be presented by sound. The output form of the sound is not particularly limited; the sound may be output from a speaker included in the television display device 11, or the sound may be output from a clock connected to a network (including the network 8 in FIG. 1).

In addition, for example, as described in the description of the process of steps S4 and S5 in FIG. 5, there is not always one recommended content. Specifically, while only one broadcasting station 1 and one distribution server 5 are drawn in the example of FIG. 1, there are a large number of broadcasting sources or distribution sources of actual contents, and the large number of broadcasting sources or distribution sources each broadcast or distribute various contents in a same time period. Thus, a plurality of contents from a plurality of broadcasting sources or distribution sources among the large number of broadcasting sources or distribution sources can be recommended contents.

In such a case, information indicating the presence of a plurality of recommended contents, for example the number of recommended contents may be included in the recommendation notice 21.

Examples of the form of presentation of the recommendation notice 21 have been described above.

Description will next be made of examples of the form of presentation of the recommendation confirming dialog 22.

For example, as with the recommendation notice 21, the recommendation confirming dialog 22 can also be presented in a different color, size, form, blinking state or the like according to a recommendation element or the like. Also in this case, the color, size, form, blinking state or the like may be changed in the whole of the recommendation confirming dialog 22 or a part of the recommendation confirming dialog 22.

In addition, for example, as described in the description of the process of steps S4 and S5 in FIG. 5, there is not always one recommended content. Specifically, while only one broadcasting station 1 and one distribution server 5 are drawn in the example of FIG. 1, there are a large number of broadcasting sources or distribution sources of actual contents, and the large number of broadcasting sources or distribution sources each broadcast or distribute various contents in a same time period. Thus, a plurality of contents from a plurality of broadcasting sources or distribution sources among the large number of broadcasting sources or distribution sources can be recommended contents.

In such a case, unlike the recommendation notice 21, because of the nature of the recommendation confirming dialog 22, the recommendation confirming dialog 22 needs to at least present each of a plurality of recommended contents to the user when there is an instruction from the user. However, the form of presentation of the recommendation confirming dialog 22 is not particularly limited. Concrete examples of the form of presentation of a plurality of recommended contents by the recommendation confirming dialog 22 will be described below with reference to FIG. 8 and FIG. 9.

Figure 8:
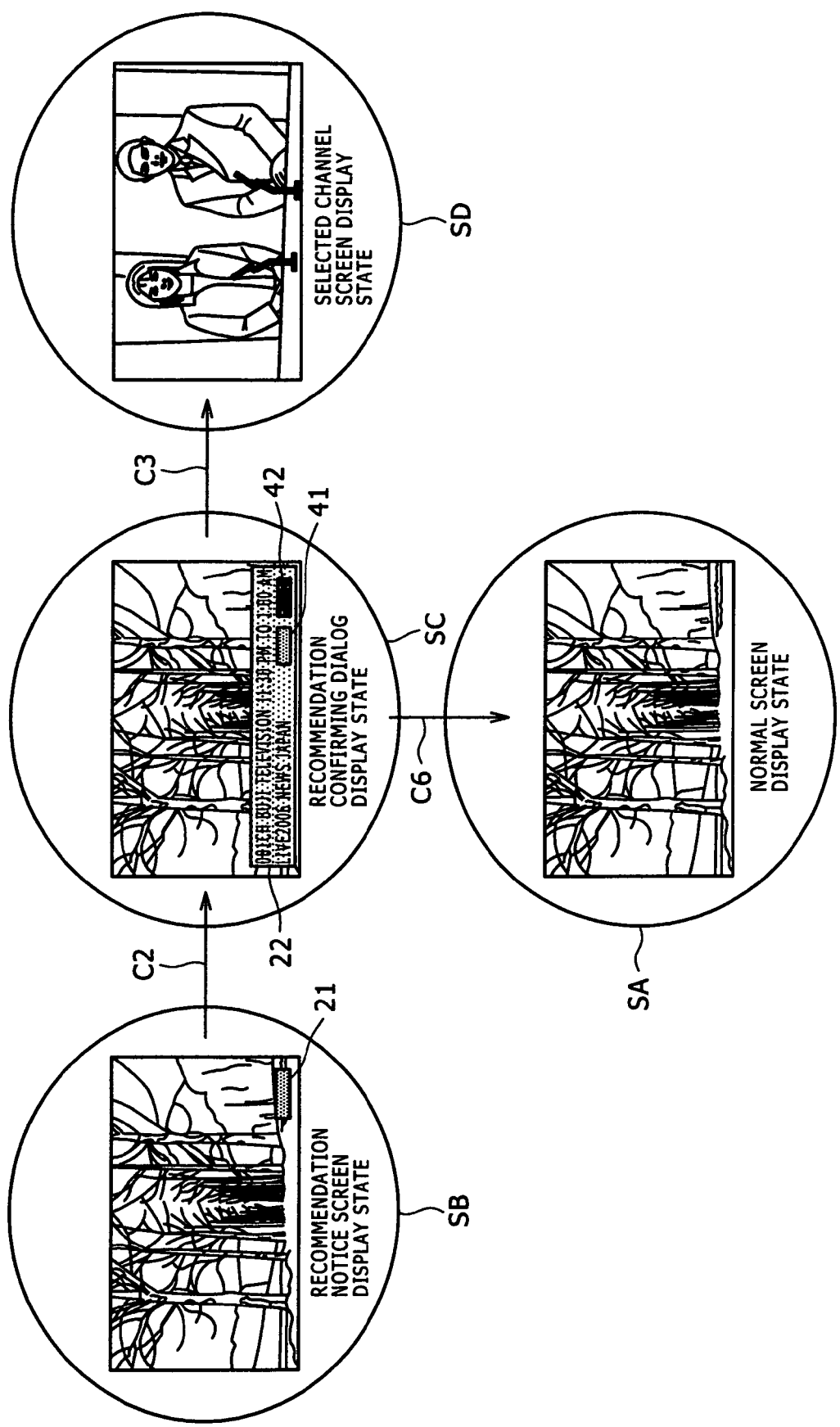
FIG. 8 is a diagram of assistance in explaining a variation of the form of presentation of the recommendation confirming dialog in FIG. 4.

For example, as shown in the recommendation confirming dialog display state SC in FIG. 8, a recommendation confirming dialog 22 may be used which recommendation confirming dialog 22 displays information on one recommended content and includes an area 41 for presenting the presence of other recommended contents to the user and an area 42 in which an operation guide or a software button for changing the displayed information to another recommended content is disposed. That is, in the example of FIG. 8, when the "ENTER" key or the like is pressed and thus the state transition condition C2 is satisfied in the recommendation notice screen display state SB in which the recommendation notice 21 is displayed, a transition is made to the recommendation confirming dialog display state SC to present the recommendation confirming dialog 22 displaying one predetermined content of one or more recommended contents to the user.

Figure 9:
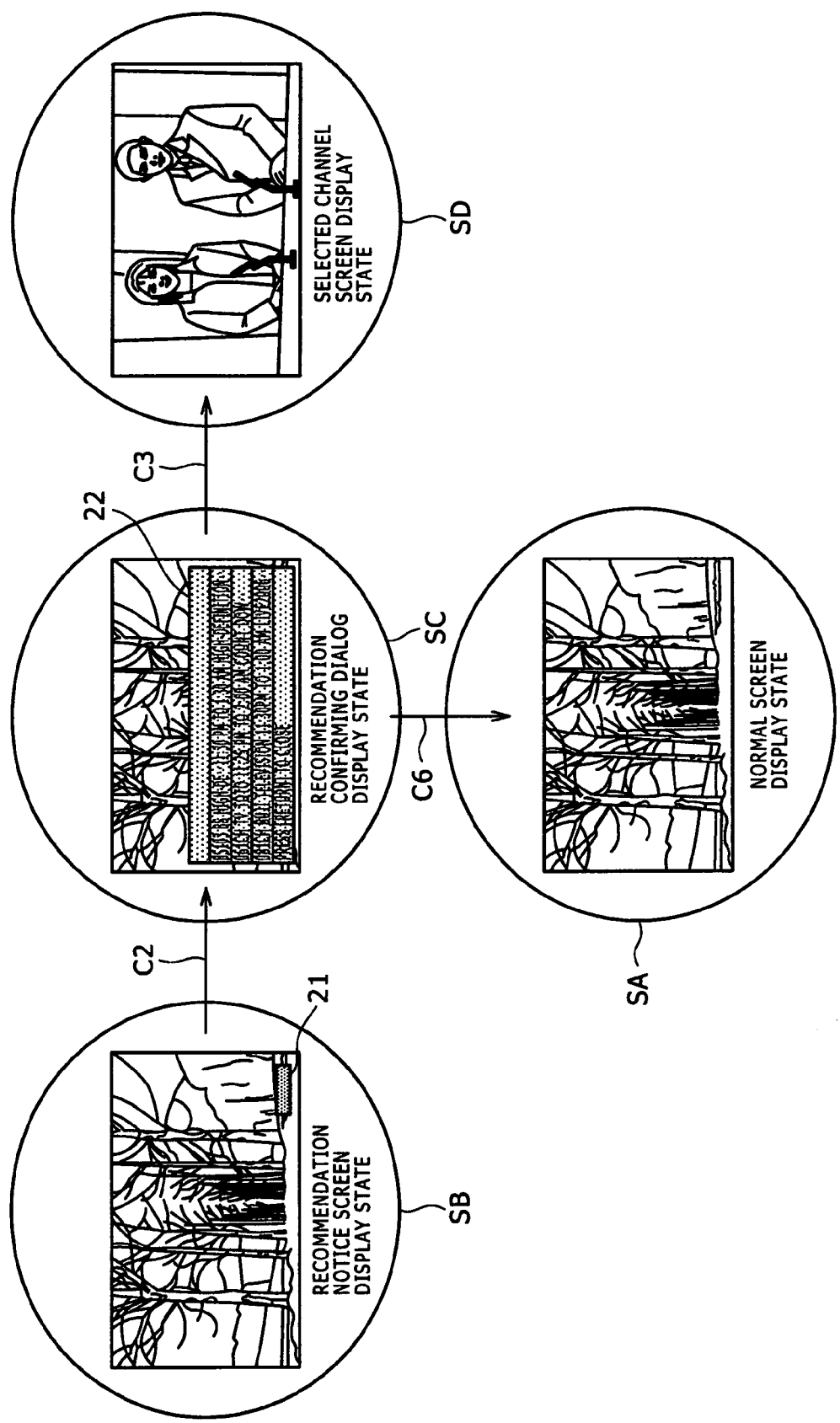
FIG. 9 is a diagram of assistance in explaining a variation of the form of presentation of the recommendation confirming dialog in FIG. 4.

On the other hand, for example, as shown in the recommendation confirming dialog display state SC in FIG. 9, a recommendation confirming dialog 22 simultaneously displaying information on a plurality of recommended contents in a list may be used. That is, in the example of FIG. 9, when the "ENTER" key or the like is pressed and thus the state transition condition C2 is satisfied in the recommendation notice screen display state SB in which the recommendation notice 21 is displayed, a transition is made to the recommendation confirming dialog display state SC to present the recommendation confirming dialog 22 displaying information on one or more recommended contents in a list to the user.

Incidentally, in this case, the recommendation notice 21 may display the number of recommendations (the number of recommended contents) in advance.

Figure 10:
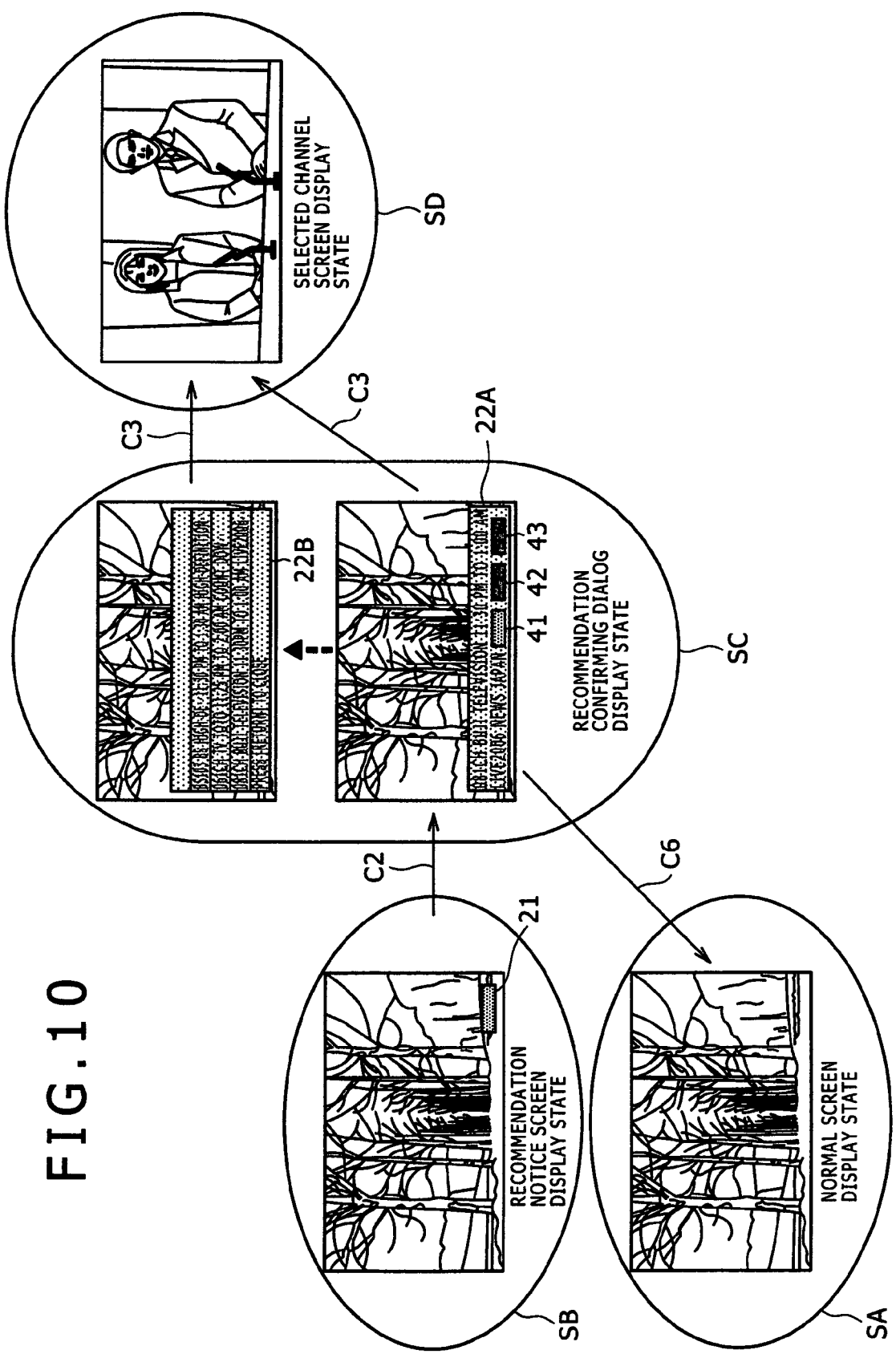
FIG. 10 is a diagram of assistance in explaining a variation of the form of presentation of the recommendation confirming dialog in FIG. 4.

Alternatively, for example, as shown in the recommendation confirming dialog display state SC in FIG. 10, the recommendation confirming dialogs 22 in the two forms described above may be combined with each other. That is, in the example of FIG. 10, when the "ENTER" key or the like is pressed and thus the state transition condition C2 is satisfied in the recommendation notice screen display state SB in which the recommendation notice 21 is displayed, a transition is made to the recommendation confirming dialog display state SC to present to the user a recommendation confirming dialog 22 displaying one predetermined content of one or more recommended contents, that is, a confirming dialog 22A in a form in a lower part of FIG. 10 in the example of FIG. 10.

The recommendation confirming dialog 22A in the form in the lower part of FIG. 10, that is, the recommendation confirming dialog 22 in the form presented to the user first includes not only an area 41 for presenting the presence of other recommended contents to the user and an area 42 in which an operation guide or a software button for changing the displayed information to another recommended content is disposed as in FIG. 8 but also an area 43 in which an operation guide or a software button for performing an operation to give an instruction to change to a form of list display of a plurality of recommended contents is disposed. When an operation relating to the area 43 is performed, as indicated by a dotted line arrow in the recommendation confirming dialog display state SC in FIG. 10, a recommendation confirming dialog 22B in a form in an upper part of FIG. 10, that is, the recommendation confirming dialog 22 simultaneously displaying information on one or more recommended contents is presented to the user.

Thus, the obstruction of viewing of a content being viewed by the user is minimized, and the user can check a plurality of viewing/recording candidates (recommended contents) as required.

FIG. 11 shows a concrete example of functional configuration of the content recommendation processing device 10 that can generate the recommendation notice 21 and the recommendation confirming dialog 22 described above as recommendation information and present the recommendation notice 21 and the recommendation confirming dialog 22 to the user.

In the example of FIG. 11, the content recommendation processing device 10 includes a data obtaining unit 121 to a recommendation information retaining unit 132.

The data obtaining unit 121 obtains data on contents, that is, data distributed from the distribution server 5 in FIG. 1 via the network 8 and data on a television broadcast program broadcast from the broadcasting station 1 and received by the television receiving device 4. When the obtained data is EPG data, the data obtaining unit 121 supplies the EPG data to a metadata extracting unit 122.

The metadata extracting unit 122 extracts various necessary metadata for generating content information to be described later with reference to FIG. 12 from the EPG data supplied from the data obtaining unit 121. The metadata extracting unit 122 then supplies the metadata to a content information generating unit 123.

The content information generating unit 123 generates a group of various information (hereinafter referred to as content information) on a predetermined content on the basis of the metadata, on the predetermined content, which is supplied from the metadata extracting unit 122. The content information generating unit 123 then supplies the content information to a content information retaining unit 124.

That is, the content information retaining unit 124 retains content information as a set of various information on each of a plurality of contents (broadcast programs and the like).

An example of such content information is shown in FIG. 12. In the example of FIG. 12, the content information is represented by a vector PP. That is, the content information generating unit 123 in FIG. 11 generates, as content information, a vector PP having information on N (N is an integral value of one or more) items included in various metadata extracted from the metadata extracting unit 122 as respective components. The content information generating unit 123 then makes the content information retaining unit 124 retain the vector PP.

The N items in this case are not limited to items defined in EPG data but refer to items that can be arbitrarily set by a designer or the like. For example, in the example of FIG. 12, major items T, G, H, S, P, A, and K are used with N=7. Pieces of information on a content for the seven respective major items are Tm, Gm, Hm, Sm, Pm, Am, and Km. The seven pieces of item information Tm, Gm, Hm, Sm, Pm, Am, and Km are substituted for the respective components of the vector PP as content information. That is, the vector PP=(Tm, Gm, Hm, Sm, Pm, Am, Km) is generated as content information.

However, when the content information is used for a process of matching with a vector UP of preference information in FIG. 13 to be described later, a vector PP'=(Tm, Gm, Pm, Am, Km) rather than the vector PP itself is used. The vector PP'=(Tm, Gm, Pm, Am, Km) is used to have the same dimensions as the vector UP of preference information to be compared with the vector PP.

In this case, the major item T refers to "Title (Title)". Title information Tm={Title} is assigned as a corresponding component of the vector PP.

The major item G refers to "Genre (Genre)". Genre information Gm={drama, variety, sports, movie, music, child-oriented/education, culture/document, news/report, other} is assigned as a corresponding component of the vector PP.

The major item H refers to a "Time Period (Hour)". Time period information Hm={morning, noon, evening, prime time, midnight} is assigned as a corresponding component of the vector PP.

The major item S refers to "Broadcasting Station (TV Station)". Broadcasting station information Sm={NNK Sogo, NNK Kyouiku, Asia Television, TTS, Buji, Telenichi, Toto, NNK Eisei Daiichi, NNK Eisei Daini, WOWO} is assigned as a corresponding component of the vector PP. Incidentally, though not shown in the example of FIG. 12, the distribution server 5 in FIG. 1 may be regarded as a broadcasting station, and thus the name of the distribution server 5 may be included in the broadcasting station information Sm.

The major item P refers to "Performer (Person)". Performer information Pm={personA, person B, . . . } is assigned as a corresponding component of the vector PP.

The major item A refers to "Script/Original/Direction etc. (Author)". Script/original/direction etc. information Am={person a, person b, . . . } is assigned as a corresponding component of the vector PP.

The major item K refers to "Contents (Keyword) (Keyword)". Content information Km={kw1, kw2, . . . } is assigned as a corresponding component of the vector PP.

Of the seven major items described above, the major items "G: Genre", "S: Broadcasting Station", and "H: Time Period" have fixed kinds. Therefore each of the pieces of item information Gm, Sm, and Hm can be represented by a numerical vector.

Specifically, for example, in the case of the genre information Gm={drama, variety, sports, movie, music, child-oriented/education, culture/document, news/report, other}, when the genre of the content for which the vector PP is to be generated is culture/document, the item information Gm can be represented by genre information Gm={0, 0, 0, 0, 0, 0, 1, 0, 0}.

For example, in the case of Broadcasting Station Sm={NNK Sogo, NNK Kyouiku, Asia Television, TTS, Buji, Telenichi, Toto, NNK Eisei Daiichi, NNK Eisei Daini, WOWO}, when a broadcasting station that broadcasts the content (a television broadcast program in this case) for which the vector PP is to be generated is WOWO, the item information Sm can be represented by broadcasting station information Sm={0, 0, 0, 0, 0, 0, 0, 0, 0, 1}.

As with the genre information Gm and the broadcasting station information Sm described above, the time period information Hm can be represented by a numerical vector, though a concrete example will not be described.

On the other hand, the pieces of item information Tm, Pm, Am, and Km for the major items "T: Title," "P: Performer," "A: Script/Original/Direction," and "K: Contents" cannot be simply represented by a numerical vector. Accordingly, an item value (word) and a weight (numerical value) are generated in association with each other on the basis of frequency of the word included in the metadata of the content or the like. For example, the item information Tm can be represented by a vector having item information formed by a set of an item value and a numerical value as each element as in title information Tm={Tokaido-1, Mitsuya-1, Kaidan-1}. For example, "Tokaido-1" in this example denotes that frequency of the word "Tokaido" is 1. The performer information Pm, the script/original/direction etc. information Am, and the content information Km can also be represented by a vector having item information formed by a set of an item value and a numerical value as each element, though concrete examples will not be described.

Returning to FIG. 11, the operating input unit 125 is also used as an operating input unit for the television display device 11 and the like in FIG. 1, as described above. The operating input unit 125 is for example formed by an input device such as a remote control or the like.

For example, initial registration information input by the user via the operating input unit 125, a topic for generating a user model, and the like are retained by an initial registration information retaining unit 126. That is, the initial registration information retaining unit 126 retains initially registered contents supplied from the operating input unit 125 and a topic for generating a user model. The initial registration information retaining unit 126 supplies the initially registered contents and the topic to a preference information generating unit 128 and a recommended content extracting unit 130 as required. The contents retained in the initial registration information retaining unit 126 are updated sequentially on the basis of a user operation input from the operating input unit 125. The initially registered contents include information indicating contents that the user does not like, such for example as a genre, a keyword, and a performer that the user dislikes, and information indicating contents that the user likes, such for example as a genre, a keyword, and a performer that the user likes.

An operation log obtaining unit 127 obtains an operation log of the operating input unit 125 and obtains operation logs from the television display device 11 and the recording and reproducing device 12 (FIG. 1). The operation log obtaining unit 127 supplies the operation logs to the preference information generating unit 128.

The preference information generating unit 128 generates information indicating the tendency of preferences of the user operating the content recommendation processing device 10 itself or the television display device 11 and the recording and reproducing device 12 in FIG. 1, that is, generates preference information on the basis of the operation logs, various information retained in the initial registration information retaining unit 126, and the like. The preference information generating unit 128 then makes a preference information retaining unit 129 retain the preference information. When the preference information is already retained in the preference information retaining unit 129, the preference information generating unit 128 updates contents of the preference information as appropriate on the basis of a new operation log supplied from the operation log obtaining unit 127, updated contents in the preference information retaining unit 129, and the like.

Incidentally, while positive history information and negative history information, for example, can both be used as preference information, only positive history information is used as preference information for simplicity of description in the present embodiment.

The negative history information in this case refers to information used to exclude contents that the user is negative about using (viewing or recording, for example), or that are considered undesirable to the user from recommended contents. However, as described above, the negative history information is not used in the present embodiment, and therefore detailed description thereof will be omitted.

On the other hand, the positive history information refers to information used to extract contents that the user would be positive about using (viewing or recording, for example), or that would be considered desirable to the user as candidates for recommended contents. For example, when the user uses a content (for example views or records the content), or when a recommended content included in the recommendation confirming dialog 22 (see FIG. 2 and the like) presented as recommendation information to the user as described above is accepted and used (for example viewed or recorded) by the user, metadata of the content is used as good impression metadata and a part of the positive history information. The metadata of the content is described above as a part of the positive history information because the positive history information can be represented as a vector such as the vector PP of the above-described content information, and the metadata of the content is used as information itself assigned as one component of such a vector or information for generating the component information.

Thus, in the present embodiment, preference information is generated in the form of a vector by the preference information generating unit 128, and then retained in the preference information retaining unit 129. Specifically, for example, a vector UP as shown in FIG. 13 is generated as preference information by the preference information generating unit 128 and then retained in the preference information retaining unit 129.

Specifically, in the example of FIG. 13, "Title", "Genre", "Performer", "Script/Original/Direction", and "Contents (Keyword)" are used as major items, and the vector UP including user positive history information Tup, Gup, Pup, Aup, and Kup for the respective major items as respective components, that is, UP=(Tup, Gup, Pup, Aup, Kup) is generated as preference information.

In this case, each of the pieces of positive history information Tup, Gup, Pup, Aup, and Kup is generated as information including an item value (word) and a weight (numerical value) associated with each other. As the weight (numerical value), for example a value (including a value of operation frequency) indicating a degree of preference of the user (a degree of desirability) is used. For example, in the example of FIG. 13, the positive history information Tup can be represented by a vector having title information formed by sets of an item value and a weight as respective elements, such as title positive history information Tup={(title 1-12), (title 2-3), . . . }. For example, "title 1-12" in this example means that the degree of preference of the user for "title 1" is 12. On the other hand, "title 2-3" in this example means that the degree of preference of the user for "title 2" is 3. That is, when the numerical value of the degree of preference is increased as the user preference becomes stronger, it can be determined that the user prefers "title 1" to "title 2".

Returning to FIG. 11, the recommended content extracting unit 130 extracts a content that can be determined to match the preferences of the user as a content to be recommended to the user, that is, a recommended content from the content information retaining unit 124 on the basis of the preference information retained in the preference information retaining unit 129. Incidentally, the extraction in this case refers to the extraction of information that can identify the recommended content, that is, at least a part of content information on the recommended content rather than the extraction of the recommended content itself.

Incidentally, a method for the extraction is not particularly limited. For example, a method may be used which performs a matching process on respective vectors PP'=(Tm, Gm, Pm, Am, Km) for a plurality of contents which vectors are retained in the content information retaining unit 124 (see FIG. 3) and the vector UP=(Tup, Gup, Pup, Aup, Kup) of the user preference information retained in the user preference information retaining unit 129 (see FIG. 4), and extracts a content having a vector PP', matching the vector UP as a recommended content.

That is, such a matching process is an example of the calculation of degrees of recommendation in step S4 in FIG. 5 described above. That is, the degree of the matching is an example of a degree of recommendation in step S4 in FIG. 5 described above.

The recommended content extracting unit 130 supplies one or more recommended contents thus extracted to a recommendation information generating unit 131.

The recommendation information generating unit 131 generates recommendation information for presenting the one or more recommended contents to the user in a form corresponding to the content of operation of the user via the operating input unit 125 or the like, that is, generates the recommendation notice 21 and the recommendation confirming dialog 22 in various forms described above as appropriate. The recommendation information generating unit 131 outputs the recommendation information to the television display device 11 and the recording and reproducing device 12 (FIG. 1) as appropriate. In addition, the recommendation information generating unit 131 makes the recommendation information retaining unit 132 retain the recommendation information as appropriate.

That is, the content recommendation process in FIG. 5 and FIG. 6 described above is mainly performed by the recommendation information generating unit 131. The word "mainly" is used in the above description because the content recommendation process may be performed by other functional blocks. For example, the process of step S4 is performed by the recommended content extracting unit 130 and the like under control of the recommendation information generating unit 131.

As described above, in the embodiment according to the present invention, the content recommendation processing device 10 can generate recommendation information using not only EPG data but also preference information.

Thus, recommended contents can be presented to the user effectively. For example, it is possible to present a content (broadcast program or the like) more matching the preferences of the user on the basis of preference information, and reduce the presentation of contents unnecessary to the user. In addition, it is possible to include not only information on a recommended content but also a reason for the recommendation and the like in recommendation information. That is, the recommendation reason and the like can be presented to the user. As a result, a convincing recommendation can be made to the user.

In addition, in the present embodiment, because the recommendation notice 21 is presented to the user as recommendation information before the recommendation confirming dialog 22 (FIG. 2 and the like), the user can predict notification contents to some extent.

In particular, by presenting the recommendation notice 21 in different forms such as different colors or different sizes, the user can predict a recommended content to some extent before checking the recommendation confirming dialog 22, and can also make a selection either to thereafter open the recommendation confirming dialog 22 and accept the recommendation or continue viewing a content being viewed without accepting the recommendation.

In addition, at this time, by appropriately changing the form of presentation of the recommendation notice 21, it is possible to make the user notice the recommendation notice 21 without obstructing the viewing of the user.

Specifically, for example, as described above with reference to FIG. 7, the size of the recommendation notice 21 can be changed in multiple steps. In this case, the recommendation notice 21 can first be displayed in a large size so as to be noticed by the user, and can be then displayed in a small size so as not to obstruct the viewing of the user for a period during which an operation for presenting the recommendation confirming dialog 22 (an operation of pressing the remote control or the like) is expected to be performed.

In addition, for example, as described above, by scrolling the recommendation notice 21 in the same manner as an electric bulletin board, the recommendation notice 21 can be continue being displayed without overlapping a score display area of a sports relay broadcast or the like for a long time.

In addition, for example, as described above, by blinking the recommendation notice 21, the recommendation notice 21 can be further reduced in size. As a result, the recommendation notice 21 can be easily made noticeable without becoming an obstruction.

In addition, for example, as described above, the form of presentation of the recommendation notice 21 is not limited to display, and may be sound. In this case, there is no need at all for staining a content being viewed.

In addition, the recommendation notice 21 can include useful information for the user. For example, including a recommendation reason as described above in the recommendation notice 21 enables the user viewing the recommendation reason to determine the taste of the recommended content instantly, and thus instantly make a selection as to whether to accept the recommendation.

In addition, as described above, the number of recommended contents is not limited to one, but a plurality of recommended contents may be presented. In this case, including the number of recommended contents in the recommendation notice 21 enables the user viewing the number to know how many contents (broadcast programs and the like) are selectable.

Then, in this case, as described above with reference to FIGS. 8 to 10, the plurality of recommended contents can be presented to the user effectively using the recommendation confirming dialog 22. Thus, in the present embodiment, because a plurality of recommended contents are presented to the user, the user can find a content that best suits the preferences of the user.

Incidentally, while the recommendation notice 21 and the recommendation confirming dialog 22 are displayed on a part of the screen in a state of being superimposed on a content being viewed in the above-described example, the recommendation notice 21 and the recommendation confirming dialog 22 may of course be displayed on the entire screen.

In addition, while it is assumed in the above-described example that the content recommendation processing device 10 has a function of generating the recommendation notice 21 and the recommendation confirming dialog 22 in order to facilitate the understanding of the invention, a terminal such as a television receiver, a hard disk video recorder, a personal computer or the like may have the function without such a special device being provided. Further, the recommendation notice 21 and the recommendation confirming dialog 22 generated by such a generating function do not particularly need to be used by the single terminal that has generated the recommendation notice 21 and the recommendation confirming dialog 22, but the recommendation notice 21 and the recommendation confirming dialog 22 may be used by other devices. This is shown in FIG. 1.

In addition, the recommendation information presented to the user is not limited to the forms of the recommendation notice 21 and the recommendation confirming dialog 22.

Figure 14:
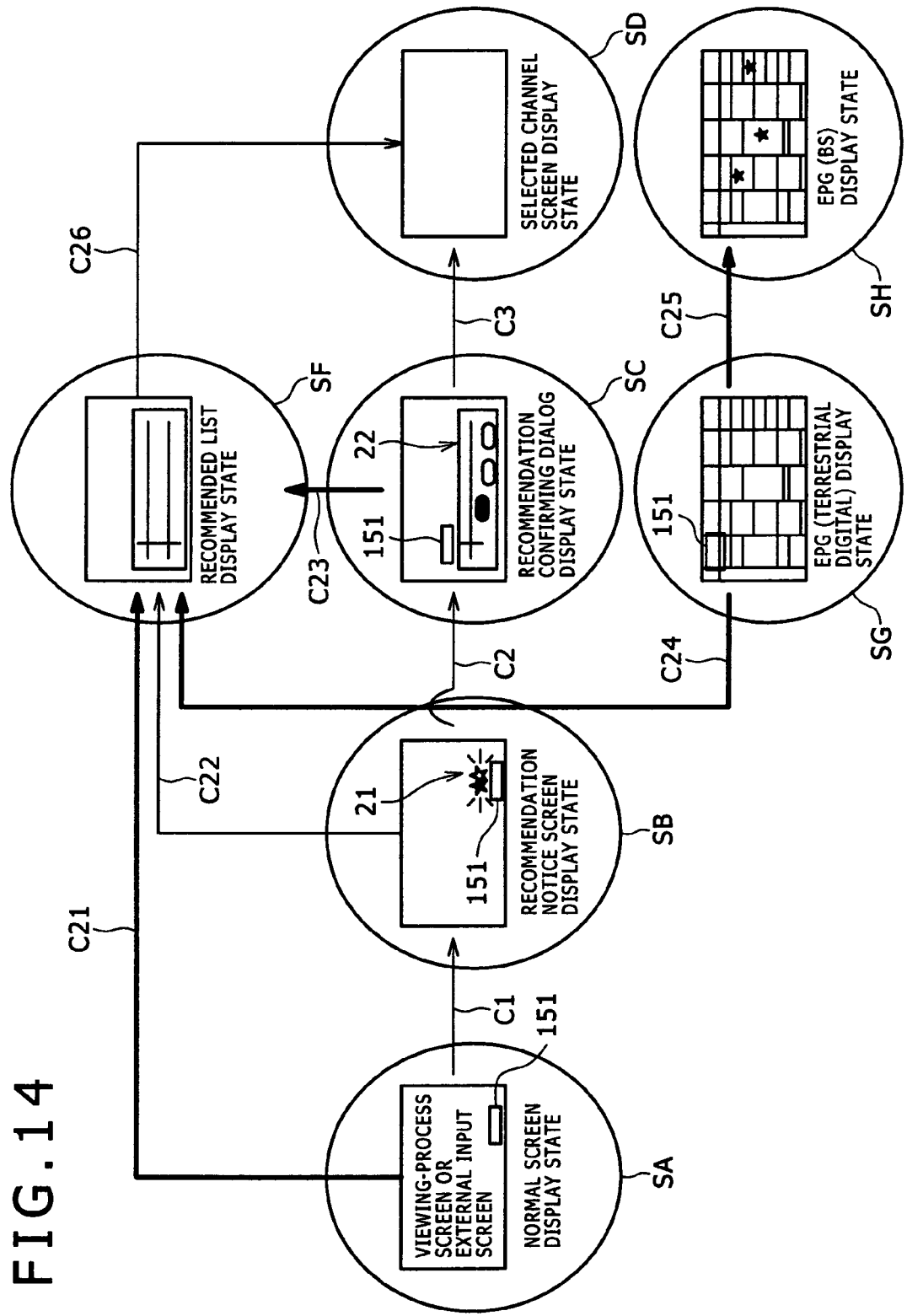
FIG. 14 is a state transition diagram showing an example of state transitions of an image displayed on the screen of the television display device 11 under control of the content recommendation processing device in FIG. 1, the example being different from the example of FIG. 2.

For example, when there are a plurality of recommended contents, the plurality of recommended contents and the number of the recommended contents may be presented using not only the recommendation notice 21 and the recommendation confirming dialog 22 but also a program table, a special list display (hereinafter referred to as a recommended list) and the like. FIG. 14 is a state transition diagram showing an example of state transitions of an image displayed on the screen of the television display device 11 when such a presentation form is adopted.

In FIG. 14, parts corresponding to those of FIG. 2 are identified by corresponding references, and description thereof will be omitted as appropriate.

In the example of FIG. 14, when the user performs a predetermined operation using the operating input unit, an option menu 151 is displayed on the screen of the television display device 11. The option menu 151 can include a message indicating the number of recommended contents, such as "three recommendations" or the like.

In the example of FIG. 14, the option menu 151 can be displayed irrespective of states such as a normal screen display state SA, a recommendation notice screen display state SB, a recommendation confirming dialog display state SC, and an EPG (terrestrial digital) display state SG. When the user performs a predetermined operation using the operating input unit after the option menu 151 is displayed, it is determined that each of state transition conditions C21, C22, C23, and C24 is satisfied, and a transition is made to a recommended list display state SF.

When the transition to the recommended list display state SF has been made, a recommended list showing a plurality of recommended contents (see a schematic diagram in the recommended list display state SF in FIG. 14) is displayed on the entire display screen of the television display device 11.

The user can select a desired content from the plurality of recommended contents included in the recommended list by performing a predetermined operation using the operating input unit. When such a selecting operation is performed, it is determined that a state transition condition C26 is satisfied, and the display state of the television display device 11 makes a transition to a selected channel screen display state SD.

When the transition to the selected channel screen display state SD has been made, video from the broadcasting source or the distribution source of the recommended content selected by such an operation is displayed on the display screen of the television display device 11. At this time, the recommended list is cleared.

Incidentally, program tables, that is, EPGs displayed on the display screen of the television display device 11 are often provided by broadcasting type. For example, in the example of FIG. 14, there are an EPG for "terrestrial digital broadcasting" which EPG is displayed in the EPG (terrestrial digital) display state SG and an EPG for "BS" which EPG is displayed in an EPG (BS) display state SH.

In this case, the option menu 151 can include a message indicating the number of not only recommended contents of a broadcasting type corresponding to an EPG now being displayed but also recommended contents of another broadcasting type.

When the user desires to check the recommended contents of the other broadcasting type, the user can perform a predetermined operation using the operating input unit. In this case, the EPG for the other broadcasting type is displayed on the display screen of the television display device 11, and display indicating the recommended contents is made in the sections of the recommended contents in the EPG.

For example, in the example of FIG. 14, when there is one or more recommended contents in "BS" in a state in which the EPG for "terrestrial digital broadcasting" is displayed, that is, in the EPG (terrestrial digital) display state SG, the option menu 151 can include a message indicating the number of recommended contents, such as "three recommendations (BS)" or the like.

In this case, when the user performs a predetermined operation using the operating input unit to check the recommended contents in "BS", it is determined that a state transition condition C25 is satisfied, and a transition is made to the EPG (BS) display state SH.

When the transition to the EPG (BS) display state SH has been made, the EPG for "BS" is displayed on the entire display screen of the television display device 11, and display indicating the recommended contents (display of black stars in the example of FIG. 14) is made in the sections of the recommended contents in the EPG for "BS".

While the above description of the embodiment according to the present invention has been made assuming the presentation of recommended contents, information presented by applying the embodiment according to the present invention does not need to be limited to information on recommended contents, but may be information on recorded contents, for example.

Specifically, for example, when a hard disk video recorder has a manual/automatic recording function, adopting the concept of the presentation form of the recommendation notice 21 (FIG. 2 and the like), it is possible to present information indicating the completion of recording together with a reason "Recording of a program has been completed" as a notice to the user at a time of the completion of the recording. Alternatively, when the hard disk video recorder has a function of automatically erasing recorded contents, it is possible to present information indicating the function together with a reason "to be erased soon" to the user.

The series of processes described above can be carried out not only by hardware but also by software.

In this case, a personal computer shown in FIG. 15, for example, may be used as at least a part of the content recommendation processing device 10 and the like in FIG. 1.

In FIG. 15, a CPU (Central Processing Unit) 201 performs various processes according to a program recorded in a ROM (Read Only Memory) 202 or a program loaded from a storage unit 208 into a RAM (Random Access Memory) 203. The RAM 203 also stores data and the like necessary for the CPU 201 to perform various processes as required.

The CPU 201, the ROM 202, and the RAM 203 are interconnected via a bus 204. The bus 204 is also connected with an input-output interface 205.

The input-output interface 205 is connected with an input unit 206 formed by a keyboard, a mouse, and the like, an output unit 207 formed by a display and the like, a storage unit 208 formed by a hard disk and the like, and a communication unit 209 formed by a modem, a terminal adapter and the like. The communication unit 209 controls communication performed with another device (not shown) via a network including the Internet.

The input-output interface 205 is also connected with a drive 210 as required. A removable recording medium 211 formed by a magnetic disk, an optical disk, a magneto-optical disk, a semiconductor memory or the like is loaded into the drive 210 as required. A computer program read from these removable recording media 211 is installed onto the storage unit 208 as required.

When the series of processes is to be carried out by software, a program constituting the software is installed from a network or a recording medium onto a computer incorporated in dedicated hardware, or for example a general-purpose personal computer that can perform various functions by installing various programs thereon.

As shown in FIG. 15, the recording medium including such a program is not only formed by the removable recording media (packaged media) 211 that are distributed to provide the program to the user separately from the device proper and have the program recorded thereon, the removable recording media including a magnetic disk (including floppy disks), an optical disk (including CD-ROM (Compact Disk-Read Only Memory) and DVD (Digital Versatile Disk)), a magneto-optical disk (including MD (Mini-Disk)), a semiconductor memory or the like, but also formed by the ROM 202, the hard disk included in the storage unit 208, or the like that is provided to the user in a state of being preincorporated in the device proper and which has the program recorded therein or thereon.

It is to be noted that in the present specification, the steps describing the program recorded on the recording medium include not only processes carried out in time series in the described order but also processes carried out in parallel or individually and not necessarily in time series.

In addition, in the present specification, a system refers to an apparatus as a whole formed by a plurality of devices or processing units.

In addition, for example, while only television broadcast programs and distribution streaming data are used as contents in the above-described embodiments, the contents are not limited to the above-described embodiments, of course. That is, the contents widely refer to things produced by creative activities of humans, and the present invention is applicable to all such contents.

For example, movies, music, dramas, literature, pictures, cartoons, animations, or computer games as well as characters, graphics, colors, sounds, movements, or video or combinations thereof or programs for providing information thereon via a computer are an example of contents, and any of the above can be applied to the present invention. That is, these various kinds of contents can be recommended.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for recommending contents, said information processing apparatus comprising:
recommendation information generating means for generating recommendation information on content to be recommended to a user, and when the recommendation information is presented to said user, for changing a form of presentation of at least a part of the recommendation information,
wherein said recommendation information generating means generates first recommendation information on said recommended content and presents the first recommendation information to said user, the first recommendation information being a recommendation notice indicating that distribution of said recommended content is to start within a predetermined time, the recommendation notice being a symbol icon, and when said user gives a predetermined instruction in response to the recommendation notice symbol icon being presented, said recommendation information generating means generates second recommendation information on said recommended content and presents the second recommendation information to said user, the second recommendation information being a description of the recommended content, whereby the form of presentation of said recommendation information is changed;

operating input means for obtaining operating input for at least one of a display device that displays the distributed content or a recording and reproducing device that at least one of records or reproduces the distributed content;

operation log obtaining means for obtaining an operation log of at least one of the operating input means, the display device, or the recording and reproducing device; and preference information generating means for generating preference information indicating a tendency of preferences of a user operating at least one of the information processing apparatus, the display device, or the recording and reproducing device based on the operation log obtained from the operation log obtaining means, wherein the recommendation information generating means generates the recommendation information based on the preference information.

2. The information processing apparatus according to claim 1, wherein said recommendation information generating means changes the form of presentation of said recommendation information by displaying at least a part of said recommendation information as an animation.

3. The information processing apparatus according to claim 2, wherein said recommendation information generating means changes the form of presentation of said recommendation information by temporally changing size of display of at least a part of said recommendation information.

4. The information processing apparatus according to claim 2, wherein said recommendation information generating means changes the form of presentation of said recommendation information by temporally changing a spatial position of display of at least a part of said recommendation information.

5. The information processing apparatus according to claim 2, wherein said recommendation information generating means changes the form of presentation of said recommendation information by making blinking display of at least a part of said recommendation information.

6. The information processing apparatus according to claim 1, wherein said recommendation information generating means changes the form of presentation of said recommendation information by changing a form of output of sound according to said recommendation information.

7. The information processing apparatus according to claim 1, further comprising recommended content extracting means for setting one or more contents that are being distributed or whose distribution is to be started from one or more distribution sources, respectively, as processing objects, and extracting one or more recommended contents from said processing objects, wherein said recommendation information generating means changes the form of presentation of at least a part of said recommendation information according to a description of a predetermined element of one or more elements related to a process of extracting said recommended content by said recommended content extracting means.

8. The information processing apparatus according to claim 7, wherein a recommendation reason which is a reason that said recommended content extracting means has extracted said recommended content is used as said predetermined element, and said recommendation information generating means includes said recommendation reason of said recommended content in said recommendation information, whereby the form of presentation of said recommendation information is changed for each content extracted as said recommended content by said recommended content extracting means.

9. The information processing apparatus according to claim 1, wherein there are a plurality of said recommended contents, and said recommendation information generating means includes information indicating a number of said plurality of recommended contents in said first recommendation information and includes information for enabling said user to identify each of said plurality of recommended contents in said second recommendation information.

10. The information processing apparatus according to claim 1, wherein said second recommendation information at least includes a first area for displaying content information on a predetermined one of said plurality of recommended contents and a second area for displaying information offered for an operation of changing the content information displayed in said first area.

11. The information processing apparatus according to claim 1, wherein said second recommendation information at least includes an area for displaying a list of each piece of content information on each of said plurality of recommended contents.

12. The information processing apparatus according to claim 1, wherein a form of presentation of said second recommendation information includes a first presentation form displaying a first image at least including a first area for displaying content information on a predetermined one of said plurality of recommended contents and a second area for displaying information offered for an operation of changing the content information displayed in the first area, and a second presentation form displaying a second image at least including a third area for displaying a list of each piece of content information on each of said plurality of recommended contents, and said recommendation information generating means presents said second recommendation information while switching between said first presentation form and said second presentation form.

13. The information processing apparatus according to claim 1, further comprising data obtaining means for obtaining data on distributed content.

14. The information processing apparatus according to claim 13, further comprising metadata extracting means for extracting metadata from the distributed content.

15. The information processing apparatus according to claim 14, further comprising content information generating means for generating content information on the distributed content based on the extracted metadata.

16. The information processing apparatus according to claim 1, further comprising initial registration information retaining means for retaining initially registered content supplied from the operating input means and for retaining a topic for generating a user model.

17. An information processing method an information processing apparatus for recommending contents, said information processing method comprising:

generating recommendation information on content to be recommended to a user, and when the recommendation information is presented to said user, changing a form of presentation of at least a part of the recommendation information, wherein said generating recommendation information step generates first recommendation information on said recommended content and presents the first recommendation information to said user, the first recommendation information being a recommendation notice indicating that distribution of said recommended content is to start within a predetermined time, the recommendation notice being a symbol icon, and when said user gives a predetermined instruction in response to the recommendation notice symbol icon being presented, said recommendation information generating means generates second recommendation information on said recommended content and presents the second recommendation information to said user, the second recommendation information being a description of the recommended content, whereby the form of presentation of said recommendation information is changed;

obtaining operating input for at least one of a display device that displays the distributed content or a recording and reproducing device that at least one of records or reproduces the distributed content;

obtaining an operation log of at least one of the operating input, the display device, or the recording and reproducing device; and generating preference information indicating a tendency of preferences of a user operating at least one of the information processing apparatus, the display device, or the recording and reproducing device based on the obtained operation log, wherein the recommendation information generating step generates the recommendation information based on the preference information.

18. A processor encoded with a program executed by a computer for carrying out a process for recommending contents, said process comprising:

generating recommendation information on content to be recommended to a user, and when the recommendation information is presented to said user, changing a form of presentation of at least a part of the recommendation information, wherein said generating recommendation information step generates first recommendation information on said recommended content and presents the first recommendation information to said user, the first recommendation information being a recommendation notice indicating that distribution of said recommended content is to start within a predetermined time, the recommendation notice being a symbol icon, and when said user gives a predetermined instruction in response to the recommendation notice symbol icon being presented, said recommendation information generating means generates second recommendation information on said recommended content and presents the second recommendation information to said user, the second recommendation information being a description of the recommended content, whereby the form of presentation of said recommendation information is changed;

obtaining operating input for at least one of a display device that displays the distributed content or a recording and reproducing device that at least one of records or reproduces the distributed content;

obtaining an operation log of at least one of the operating input, the display device, or the recording and reproducing device; and generating preference information indicating a tendency of preferences of a user operating at least one of the information processing apparatus, the display device, or the recording and reproducing device based on the obtained operation log, wherein the recommendation information generating step generates the recommendation information based on the preference information.

19. An information processing apparatus for recommending contents, said information processing apparatus comprising:

a recommendation information generator generating recommendation information on content to be recommended to a user, and when the recommendation information is presented to said user, said recommendation information generator changing a form of presentation of at least a part of the recommendation information, wherein said recommendation information generator generates first recommendation information on said recommended content and presents the first recommendation information to said user, the first recommendation information being a recommendation notice indicating that distribution of said recommended content is to start within a predetermined time, the recommendation notice being a symbol icon, and when said user gives a predetermined instruction in response to the recommendation notice symbol icon being presented, said recommendation information generating means generates second recommendation information on said recommended content and presents the second recommendation information to said user, the second recommendation information being a description of the recommended content, whereby the form of presentation of said recommendation information is changed;

an operating input obtaining operating input for at least one of a display device that displays the distributed content or a recording and reproducing device that at least one of records or reproduces the distributed content;

an operation log obtaining an operation log of at least one of the operating input means, the display device, or the recording and reproducing device; and a preference information generator generates preference information indicating a tendency of preferences of a user operating at least one of the information processing apparatus, the display device, or the recording and reproducing device based on the operation log obtained from the operation log obtaining means, wherein the recommendation information generator generates the recommendation information based on the preference information.

* * * * *